United States Patent [19]
Sanchez

[11] Patent Number: 5,841,652
[45] Date of Patent: Nov. 24, 1998

[54] ADAPTIVE-PREDICTIVE CONTROL AND OPTIMIZATION SYSTEM

[75] Inventor: Juan Martin Sanchez, Madrid, Spain

[73] Assignee: Scap Europa, S.A., Spain

[21] Appl. No.: 627,055

[22] Filed: Apr. 3, 1996

[51] Int. Cl.$^6$ ................................................. G05B 13/02
[52] U.S. Cl. ................. 364/164; 364/152; 364/148.01
[58] Field of Search .................................. 364/146, 147, 364/148–157, 160–165, 172, 191, 188, 148.01–148.1; 395/903, 904, 906, 914; 706/903, 904, 906, 914

[56] References Cited

U.S. PATENT DOCUMENTS

| | | | |
|---|---|---|---|
| 4,197,576 | 4/1980 | Sanchez | 364/151 |
| 4,358,822 | 11/1982 | Sanchez | 364/151 |
| 4,528,623 | 7/1985 | Tachibana | 364/191 |
| 5,301,101 | 4/1994 | MacArthur et al. | 364/156 |
| 5,347,446 | 9/1994 | Iino | 364/149 |
| 5,371,895 | 12/1994 | Bristol | 364/191 |
| 5,568,378 | 10/1996 | Wojsznis | 364/164 |
| 5,627,747 | 5/1997 | Melton et al. | 364/188 |

FOREIGN PATENT DOCUMENTS 1583544  7/1977  United Kingdom .

OTHER PUBLICATIONS

"The Optimization of the Cement Production"; SCAP Europa, S.A., 1991, pp. 6–7.
"The Optimization of Industrial Processes" Brochure, SCAP Europa, S.A. 1993.
"SCAP Optimization Systems—Structures and Components"; Brochure Sections 1–3, SCAP Europa, S.A., 1995.

*Primary Examiner*—Reba I. Elmore
*Assistant Examiner*—Steven R. Garland
*Attorney, Agent, or Firm*—Ostrolenk, Faber, Gerb & Soffen, LLP

[57] ABSTRACT

An Adaptive-Predictive Control and Optimization System enables a designer to construct a control and optimization scheme using graphical operators to represent adaptive-predictive controllers and to represent complementary operating logic operations. The control and optimization scheme controls an actual or simulated process in accordance with at least one predefined process performance criteria and is constructed by integrating the adaptive-predictive controllers with the complementary operating logic by selecting and interconnecting their corresponding graphical representations. The adaptive-predictive controller predicts the value of an adaptive-predictive driven vector during at least one future sampling instant, and generates, at each of the sampling instants, a control vector that drives the value of the predicted driven vector to satisfy a predefined controller performance criterion at the at least one future sampling instant. The complementary operating logic drives the process toward predefined process performance criteria such as optimizing the process performance, being responsive to at least one process operating condition and interacting with the process instrumentation.

95 Claims, 13 Drawing Sheets

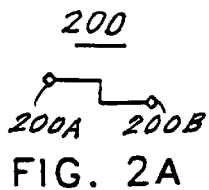
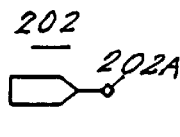
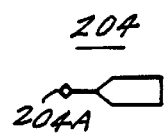
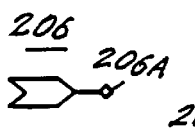
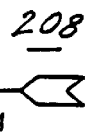
FIG. 2A  FIG. 2B  FIG. 2C  FIG. 2D  FIG. 2E
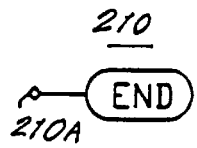
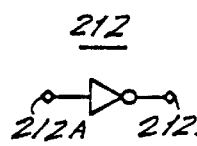
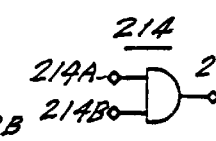
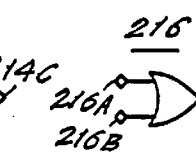
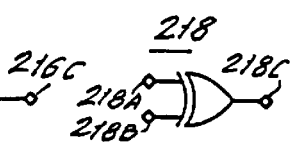
FIG. 2F  FIG. 2G  FIG. 2H  FIG. 2I  FIG. 2J
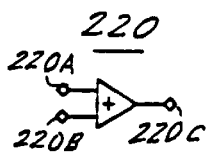
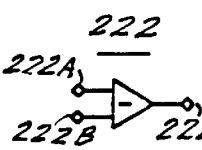
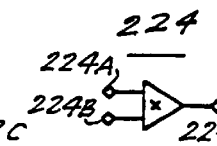
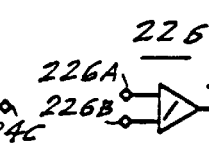
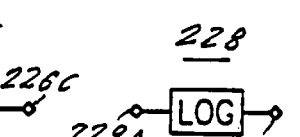
FIG. 2K  FIG. 2L  FIG. 2M  FIG. 2N  FIG. 2O
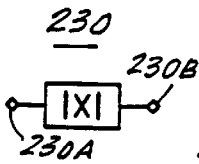
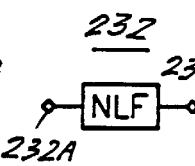
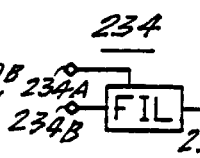
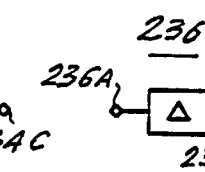
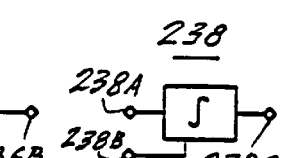
FIG. 2P  FIG. 2Q  FIG. 2R  FIG. 2S  FIG. 2T
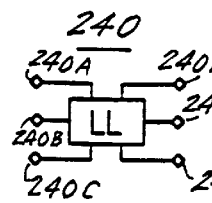
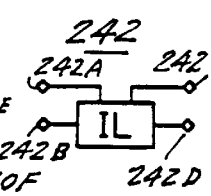
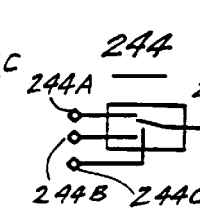
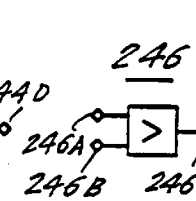
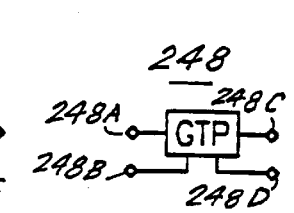
FIG. 2U  FIG. 2V  FIG. 2W  FIG. 2X  FIG. 2Y
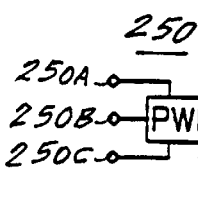
FIG. 2Z
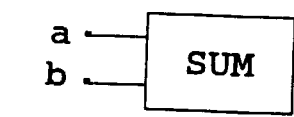
FIG. 2A'

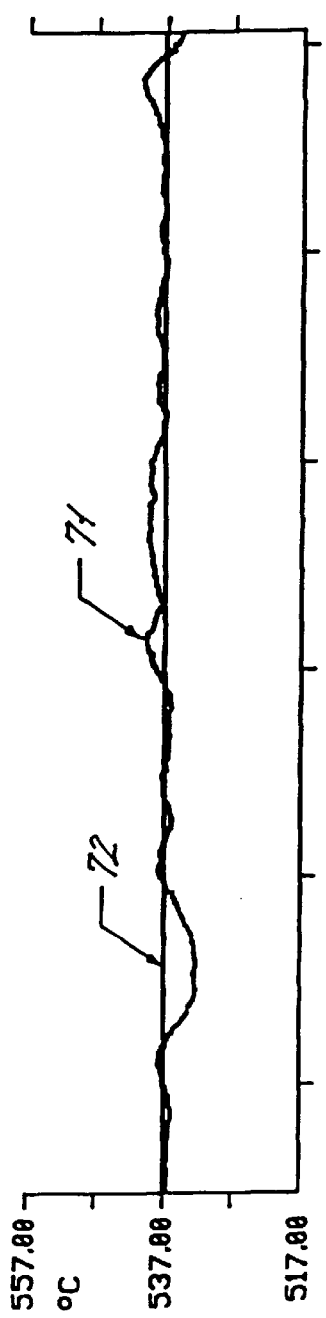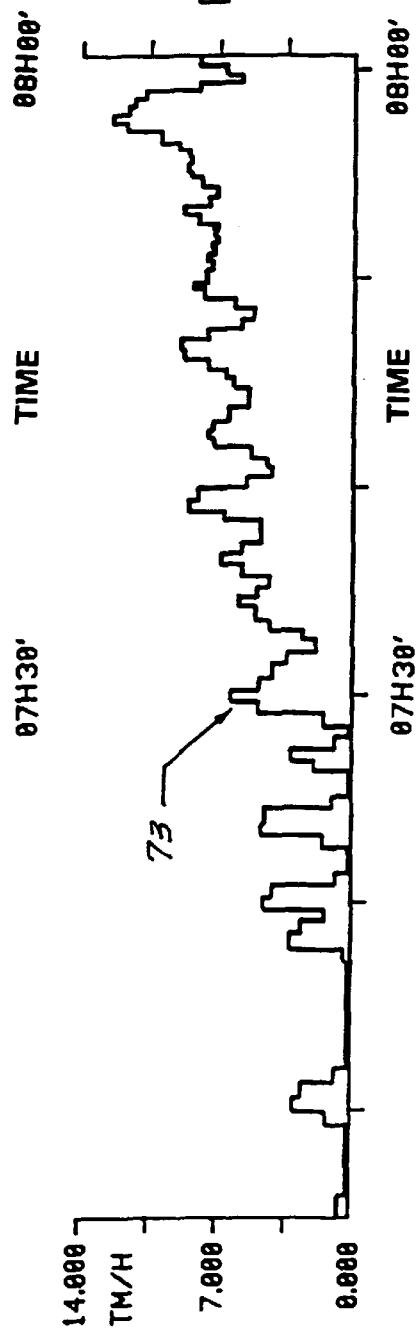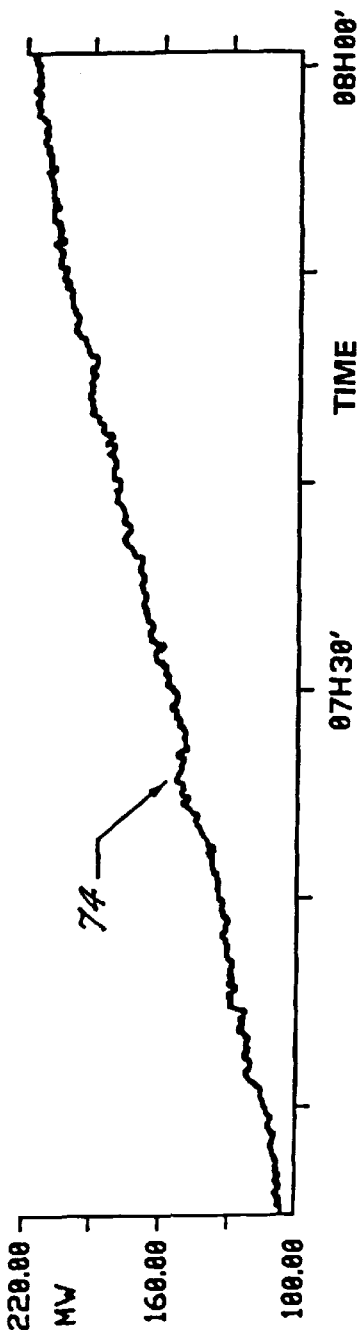

ADAPTIVE-PREDICTIVE CONTROL AND OPTIMIZATION SYSTEM

BACKGROUND OF THE INVENTION

The present invention is directed to an Adaptive-Predictive Control and Optimization System (APCOS) for controlling single-input single-output or multivariable time-variant processes with known or unknown parameters and with or without time delays. More particularly, the present invention is directed to an Adaptive-Predictive Control and Optimization System which integrates adaptive-predictive control systems with complementary operating logic (COL) to interact with process instrumentation, respond to various process operating conditions, and/or optimize the process operation in accordance with process performance criteria.

The application of adaptive-predictive control systems using adaptive-predictive controllers are well known. Such adaptive-predictive control systems are described in U.S. Pat. No. 4,358,822, issued Nov. 9, 1982, entitled "Adaptive-Predictive Control System"; U.S. Pat. No. 4,197,576, issued Apr. 8, 1980, entitled "Adaptive-Predictive Control System"; both of which are incorporated herein in their entirety by this reference; and United Kingdom Patent No. 1583545, dated Jul. 1, 1977 and entitled "Improvements In and Relating to Control Systems"; all issued to the applicant. The adaptive-predictive controllers are operable to predict the value of a set of dynamic variables that form a dynamic adaptive-predictive driven vector at a future sampling instant and generate, at each sampling instant, an adaptive-predictive control vector that causes the predicted dynamic adaptive-predictive driven vector to equal a predetermined desired dynamic adaptive-predictive driven vector at the future sampling instant.

Such adaptive-predictive control systems are useful in many diverse fields such as naval engineering, energy engineering, air conditioning, chemical engineering and cement production and are used to control real or simulated processes. In these fields, the adaptive-predictive controllers may achieve precise control of the critical process variables that may behave non-linearly, that may be time-varying, or may have a multivariable dynamic nature. The adaptive-predictive controllers operate to stabilize the critical process variables and to maintain their value around their set points with minimal deviation.

In addition to achieving precise control of the critical process variables, it is also desirable to drive these variables to values that attain the best process performance. The performance criteria may include the minimization of resource consumption, such as energy consumption and raw material consumption, the maximization of production quantity and quality, achieving stable and safe operation, as well as other criteria that result in economic benefit, better service, less maintenance, or longer life expectancy for the process apparatus.

To attain the best process performance using an adaptive-predictive controller, the relation of the adaptive-predictive controller with the process instrumentation, the effect of the process operating conditions and the desired process objectives must be taken into account.

The relation between the adaptive-predictive controller and the process instrumentation that are considered include: (i) determining whether the process output variables that are measured by the process apparatus sensors are suitable to be driven by the adaptive-predictive controller or whether the measured process output variables need to be transformed into variables better suited to be driven; and (ii) determining whether the control vector generated by the adaptive-predictive controller is to be directly applied to the process apparatus or is to be first transformed to a form better suited to be supplied to the process apparatus.

The process operating conditions that are considered include: (i) how the mode and manner of operation of the adaptive-predictive controller are affected by changes in the process operating conditions and how to adjust the mode and manner of operation accordingly; (ii) how changes in the process operating conditions affect the dynamic process output variables and the adaptive-predictive driven variables; and (iii) how changes in the process operating conditions affect the selected control period.

The operating performance criteria that are considered determine the value of the adaptive-predictive controller set points and how these set points change with time to attain the desired performance criteria.

In the known implementations of adaptive-predictive control systems, such as those described in the related patents, these determinations are often made by a human operator. It is therefore desirable that additional logic operations be derived that are complementary to the operation of the adaptive-predictive controller and that are fully integrated with the adaptive-predictive controller to perform these determinations and thereby better control the operation of the dynamic processes. It is also desirable that the types of logic operation be applicable to a wide variety of engineering fields.

Thus, it is desirable that complementary operating logic (COL) be designed that can attain the particular control objectives, that can be responsive to the process operating conditions and that can satisfactorily operate with the process instrumentation. The complementary operating logic should therefore determine the operation of the adaptive-predictive controllers as part of an overall adaptive-predictive control and optimization system which satisfies the operating needs of various industrial processes so that the adaptive-predictive controllers are utilized in the most advantageous manner and attain the optimum process performance.

Furthermore, the known implementations of adaptive-predictive control systems often include a system external to the adaptive-predictive control system, known as a master system, that responds to instructions entered by a human operator and that adjusts the set point values of the adaptive-predictive controller. The master system and the adaptive-predictive control system are individually programmed using a high level programming language and then compiled separately into two or more respective object code programs. The respective object code programs are executed separately but must be capable of communicating with each other so that the master system and adaptive-predictive control system operate properly. However, the respective programs are not readily synchronized to permit communication between them.

The respective programs must also be written by specialized programmers that have intricate knowledge of the process that is being controlled as well as of the master system code and the adaptive-predictive control system code. The software that is developed and implemented for each respective application is thus unique to the respective application and is difficult to recognize and interpret.

Moreover, when implementing or maintaining the systems, the programmers that are most able to modify the programs are the specialized programmers who wrote the programs. For others to modify the programs, detailed study of the code is necessary. Additionally, there is a high probability that programming errors may be introduced that are difficult to debug.

It is thus also desirable that any person qualified in the area of process control, rather than an expert programmer, be able to design and develop the complementary operating logic and be able to integrate the logic with the adaptive-predictive controller in a single program using standard computer aided design tools and well-known procedures.

SUMMARY OF THE INVENTION

It is therefore an object of the present invention to control the operation of a real or simulated process in accordance with predefined process performance criteria.

Another object of the present invention is to provide complementary operating logic that is integrated with an adaptive-predictive controller to control the process in accordance with predefined process performance criteria.

It is a further object of the present invention to provide complementary operating logic that is integrated with adaptive-predictive controllers and that adjusts values inputted to or outputted from the adaptive-predictive controller to control a process in accordance with predefined process performance criteria.

Another object of the present invention is to enable a designer to develop control and optimization schemes that control the operation of a process in accordance with predefined process performance criteria.

Yet another object of the present invention is to permit a designer to design complementary operating logic and integrate it with adaptive-predictive controllers to implement a control and optimization scheme.

It is still another object of the present invention to enable a designer to build control and optimization schemes from a control and optimization strategy using computer aided design.

Additionally, it is an object of the present invention to enable a designer to build control and optimization schemes by selecting and interconnecting graphical operators that represent respective types of adaptive-predictive controllers and that represent various complementary operating logic operations.

The above and other objects of the present invention are achieved by a method of designing and a system for facilitating the design of a control and optimization scheme. The control and optimization scheme generates a process control vector, which comprises at least one process control variable, during each of plural sampling instants. The process control vector is applied to an apparatus that carries out a process that has at least one process input variable that defines a process input vector and that has at least one process output variable. The apparatus varies the process input vector as a function of the process control vector.

At least one controller is defined. The controller predicts a value of a driven vector, that is comprised of at least one variable, during at least one future sampling instant. The controller generates, at each of the plural sampling instants, a control vector that drives the value of the predicted driven vector to satisfy a predefined controller performance criterion at the at least one future sampling instant.

At least one complementary operating logic operation is selected. The controller and the complementary operating logic operation are combined to control the process in accordance with at least one predefined process performance criterion.

In accordance with this aspect of the present invention, the adaptive-predictive controller may be selected from a group of graphical input/output operators each of which represents a respective type of adaptive-predictive controller implementation. Also, the complementary operating logic may be selected from a group of graphical input/output operators that each represents a respective complementary logic operation. Additionally, at least one interconnection may be defined between a respective input or output of the selected one of the first group of graphical input/output operators with a respective input or output of the selected one of the second group of graphical input/output operators.

The objects of the present invention are further achieved by a method of and a system for generating a process control vector during each of plural sampling instants. A value of a driven vector, which is comprised of at least one variable, is predicted during at least one future sampling instant. At each of the plural sampling instants, an outputted control vector is generated that drives the value of the predicted driven vector to satisfy a predefined controller performance criterion at the at least one future sampling instant. At least one complementary operating logic operation is performed to control the process in accordance with at least one predefined process performance criterion.

In accordance with the present invention, the controller may generate, at each of the sampling instants, a desired driven vector that represents a desired value of the driven vector at the future sampling instant. The controller also may generate, at each of the sampling instants, a control vector that drives the value of the predicted driven vector to equal that of the desired driven vector at the future sampling instant.

Alternatively, the controller uses an alternative advanced control methodology to generate the control vector that satisfies the predefined controller performance criterion.

In further accordance with the present invention, the complementary operating logic may be selected such that the process is optimized in accordance with the predefined performance criteria. The complementary operating logic may be selected such that when it is combined with the controller, the controller generates the outputted control vector that optimizes the process in accordance with the process performance criteria.

The complementary operating logic may be responsive to at least one process operating condition. The process performance criteria may be the attaining of an optimum value of the process operating condition. The controller and the complementary operating logic may be combined so that the controller generates the control vector that enables the approaching of the optimum value. The predefined process performance criteria may be a change in the process operating condition, and the controller and the complementary operating logic are integrated so that the controller generates the control vector as a function of the change of the process operating conditions. The predefined process performance criteria may be the control of at least one process instrumentation that is controlled by the complementary operating logic.

The complementary operating logic may vary the value of a set point of the controller, may vary the value of a control period for the controller, may control an actuator or may operate as a function of a measured value. The complementary operating logic may transform the process output vector into the driven vector or may transform the control vector outputted by the controller into the process control vector.

The complementary operating logic may include a logic operator, an arithmetic operator, an analog operator, a mixed operator, a non-linear operator, a filtering operator, a range restricting operator, a multiplexing operator or a pulse forming operator.

Other objects, features and advantages of the present invention will be apparent from the detailed description below.

BRIEF DESCRIPTION OF THE DRAWINGS

For the purpose of illustrating the invention, there are shown in the drawings several embodiments which are presently preferred; it being understood, however, that this invention is not limited to the precise arrangements and instrumentalities shown.

FIGS. 2A–2Z and 2A' are diagrams showing graphical representations of various types of complementary operating logic operators according to an embodiment of an Adaptive-Predictive Control and Optimization System of the present invention;

FIGS. 7A–7C are diagrams illustrating experimental results of the implementation of the scheme of FIGS. 6A–6B;

Figure 1A:
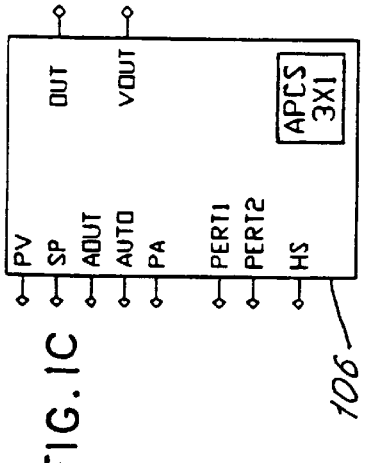
FIGS. 1A–1F are diagrams showing graphical representations of various adaptive-predictive control operators with their corresponding inputs and outputs according to an embodiment of an Adaptive-Predictive Control and Optimization System of the present invention.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

DETAILED DESCRIPTION OF THE INVENTION

The present invention is directed to an Adaptive-Predictive Control and Optimization System (APCOS) that enables a designer to select adaptive-predictive controllers, develop complementary operating logic and integrate the complementary operating logic with the adaptive-predictive controllers to build control and optimization schemes that control the operation of a real or simulated process and that drive a process towards predefined process criteria such as optimizing the process performance, taking into account process operating conditions, and interacting with the process instrumentation.

The control and optimization schemes may be developed and integrated by writing software code for an individual computer program that is to be periodically executed. A control and optimization strategy is set out, and the strategy is implemented by generating high level programming language instructions that represent the functions of one or more adaptive-predictive controllers, as described in the related patents, as well as represent the complementary operating logic operations. The high level programming language instructions are contained in a single program and are compiled into object code by a compiler.

The single program, however, may be difficult to maintain or modify because the software instructions that represent the operation of the complementary operating logic may be interspersed with the software instructions that represent the operation of the adaptive-predictive controller and thus are difficult to distinguish.

Therefore, in a more preferred embodiment, a computer aided design tool is used to build the control and optimization schemes by (i) selecting from graphical representations of adaptive-predictive controllers, (ii) defining complementary operating logic by selecting from graphical representations of its operations and then (iii) integrating the controllers and the complementary operating logic.

A control and optimization strategy is first set out, and then the computer-aided design tool is used to develop the control and optimization scheme that implements this strategy. The various types of adaptive-predictive controllers are each represented by a respective adaptive-predictive control graphical operator, and the various types of complementary operating logic operations are also each represented by a respective complementary operating logic graphical operator. By selecting the desired adaptive-predictive control graphical operators and the desired complementary operating logic graphical operators and then interconnecting the operators, a control and optimization scheme is constructed.

It should be noted that the complementary operating logic operations may represent advanced or classical control operations, analog operations, logic operations or mixed operations that process digital or analog signals.

An intermediate code may be derived from the control and optimization scheme using a standard compilation procedure. The intermediate code is then further compiled into object code.

The object code can then be periodically executed in a respective computing environment to control the process operation. The specific computing environment may be, for example, a microprocessor that is directly connected via input/output boards to the process signals or a computer system that interfaces with the process.

The selected control and optimization scheme can also be displayed on a monitor during its operation to give the user real-time graphical information of the operating conditions and the control actions being applied.

The computing environment is also operable to acquire the dynamic process output signals and to compute the process control vector and then transmit it. The computer may be directly connected to a realtime process via input/output boards that receive the actual process signals or may be connected to another system that interfaces with the process. Alternatively, the computer may be connected to another computer that simulates the process and that generates a simulated process output vector in response to the control vector. The simulation of the process may alternatively reside in the same computer.

The control and optimization scheme is thus implemented as follows: First, the operations that form the control and optimization strategy are defined by a user. Then, the user builds the control and optimization scheme that implements the strategy using the computer-aided design tool to select the graphical operators that correspond to the desired adaptive-predictive controllers, select the desired complementary operating logic operations and interconnect the selected graphical operators. From the selected graphical operators of the adaptive-predictive controllers, complementary operating logic operations and their interconnections, an intermediate code that represents the selected operators is generated that can be executed in various computing environments. From the intermediate code, an object code is generated that can be periodically executed in a respective computing environment.

To enable construction of the control and optimization scheme, the computer aided design tool includes a software library that contains the graphical symbols or operators which represent the adaptive-predictive controllers and the complementary logic operations. The symbols permit the easy recognition of the desired operations.

The most commonly used graphical operators that represent adaptive-predictive controllers are shown in FIGS. 1A–1F. The most commonly used graphical operators and interconnections that build the complementary operating logic are shown in FIGS. 2A–2Z. It should be noted, however, that the present invention is not limited to the operators shown herein.

Each of the graphical operators shown is associated with a set of input and output (I/O) variables. The I/O variables may represent process variables or may represent variables that are calculated or specified within the control and optimization scheme. The I/O variables include measured process output variables that are supplied to the control and optimization scheme, and include variables that comprise the process control vector.

Figure 3:
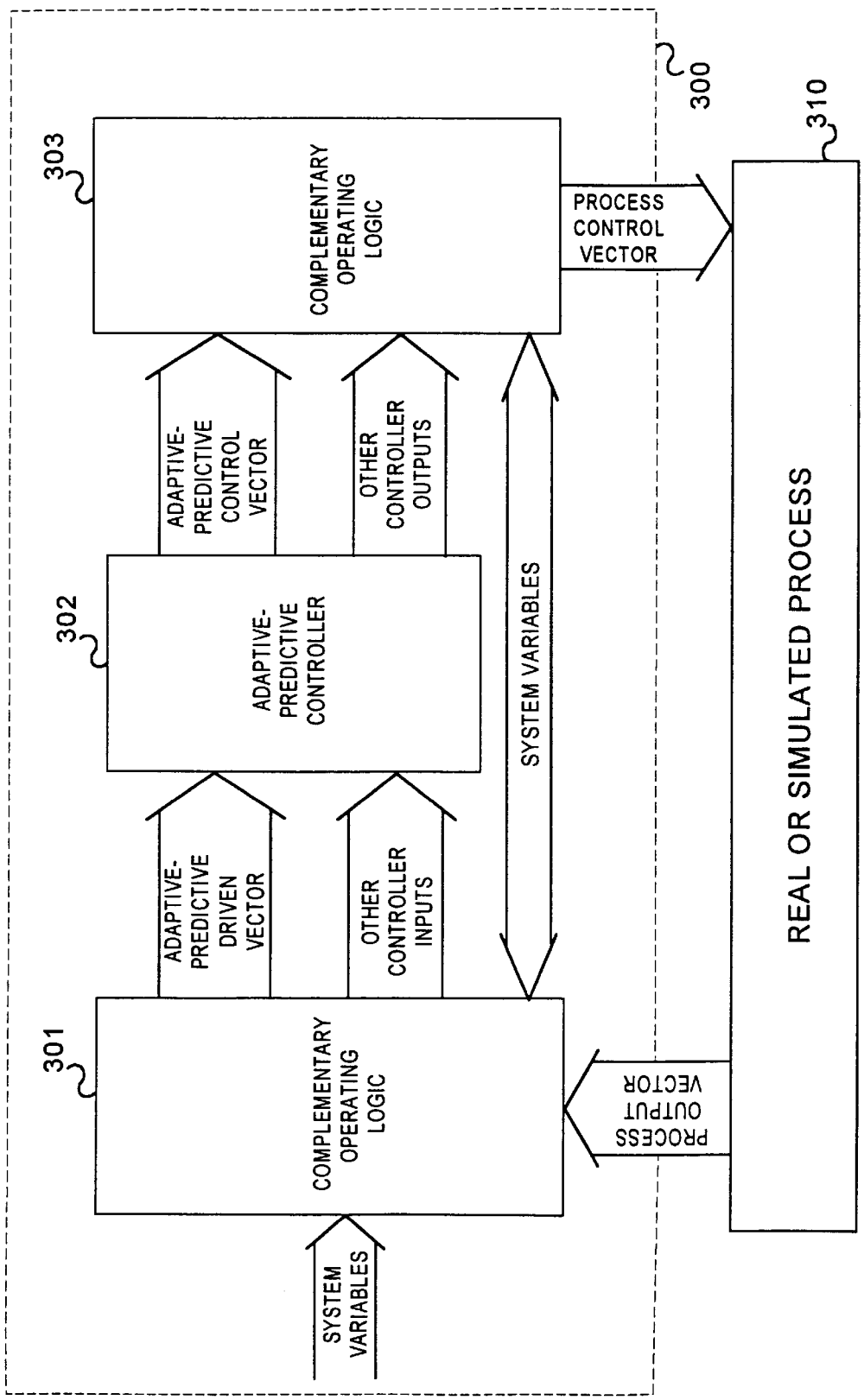
FIG. 3 is a diagram showing an example the interaction between complementary operating logic and an adaptive-predictive controller according to an embodiment of the present invention.

FIG. 3 illustrates an example of the relation between an adaptive-predictive controller and the complementary operating logic within a respective control and optimization scheme 300 and the relation between the control and optimization scheme 300 and the real or simulated process 310 that is being controlled.

A process output vector, comprised of at least one process output variable, represents the measured or simulated values of the dynamic process output variables and is supplied by a real or simulated process 310 to a pre-controller complementary operating logic 301. The complementary operating logic 301 transforms the process output vector into an adaptive-predictive driven vector, comprised of at least one adaptive-predictive driven variable, and supplies the adaptive-predictive driven vector to an adaptive-predictive controller 302. Alternatively, such as when the pre-controller complementary operating logic 301 is not included, the values of the process output vector are supplied directly to the adaptive-predictive controller and thus also represent the adaptive-predictive driven vector.

Additionally, system variables that represent the various process operating conditions and the process operating criteria are supplied to the complementary operating logic 301. The complementary operating logic 301 uses the system variable to supply the values of one or more inputs to the adaptive-predictive controller 302. These inputs may include variables that determine whether the adaptive-predictive controller operates in a manual or automatic mode, variables that determine whether the controller is to start or stop adaptation of the adaptive-predictive control model parameters, variables that determine the length of the control period, and variables that determine the set points of the adaptive-predictive driven variables.

The adaptive-predictive controller 302 uses the values of the adaptive-predictive driven vector as well as the other inputs supplied by the complementary operating logic 301 and predicts a value of a driven adaptive-predictive vector during at least one future sampling instant. The adaptive-predictive controller also generates, at each sampling instant, an adaptive-predictive control vector that is comprised of at least one adaptive-predictive control value and that drives the value of the predicted adaptive-predictive driven vector to satisfy a predefined adaptive-predictive controller performance criterion at the at least one future sampling instant. The values of the predicted adaptive-predictive driven vector and the adaptive-predictive control vector are determined in the manner described in the related patents.

To satisfy the predefined adaptive-predictive controller performance criterion, the adaptive-predictive controller may generate, at each sampling instant, a desired adaptive-predictive driven vector that represents a desired value of the adaptive-predictive driven vector at the future sampling instant and may generate, at each sampling instant, the adaptive-predictive control vector that drives the value of the predicted adaptive-predictive driven vector to equal the value of the desired adaptive-predicted driven vector at the future sampling instant. The value of the desired adaptive-predictive driven vector is also determined in the manner described in the related patents.

The adaptive-predictive controller 302 supplies the adaptive-predictive control vector to a post-controller complementary operating logic 303. Alternatively, the controller uses an alternative advanced control methodology to generate a vector which satifies a predefined controller performance criterion, and the controller delivers the vector to the complementary operating logic. The adaptive-predictive controller 302 also delivers other outputs, such as a signal that indicates the validity of the adaptive-predictive control vector, to the complementary operating logic 303.

The complementary operating logic 303 transforms the adaptive-predictive control vector into a process control vector, comprised of at least one process control value, that is supplied to the system or apparatus that carries out the real or simulated process 310. Alternatively, such as when the complementary operating logic 303 is not included, the adaptive-predictive control vector is supplied directly to the process 310 and serves as the process control vector.

It should also be noted that system variables may be supplied directly between the pre-controller complementary operating logic 301 and the post-controller complementary operating logic 303.

A standard interface to the process may be used to receive the measured values of the dynamic process output variables prior to each iteration of the object code and to output the process control variables immediately after each iteration. Additionally, standard means for the storage and use of the various system variables may also be provided.

Though various types of I/O variables are used, the most common ones are digital variables, having the value "0" or "1", and are analog variables representing measured or calculated values.

The graphical operators that are used in designing a control and optimization scheme include:

a) Graphical operators that represent implementations of adaptive-predictive controllers described in the related patents or that may represent an alternative implementation of an advanced control methodology.

b) Graphical operators that define complementary operating logic operations.

FIGS. 1A–1F show examples of graphical representations of various adaptive-predictive controllers according to the present invention.

FIG. 1A shows an example of an adaptive-predictive control operator 102 whose inputs are as follows:

Input PV (Process Variable) receives an analog input signal that represents the value of the adaptive-predictive driven variable. The adaptive-predictive driven variable may represent the result of a process output variable that is transformed by the complementary operating logic or may represent the actual measured value of a process output variable.

A SP (Set point) input receives an analog signal representing the set point value of the adaptive-predictive driven variable.

An AOUT (Applied Output) input receives the value of an adaptive-predictive control variable that was stored after the previous execution of the adaptive-predictive control operator subroutine. The value of AOUT may differ from the value previously generated by the adaptive-predictive control operator subroutine when the value is limit checked.

An AUTO (Automatic Mode) input receives a digital signal that determines the operating mode of the adaptive-predictive controller. When the value is "1", the adaptive-predictive controller is instructed to operate in an automatic (control) mode, and when the value is "0", the controller is instructed to operate in a manual (identification) mode.

An input PA (Permit Adaptation) receives a digital signal that permits (when the value is "1") or does not permit (when the value is "0") an operation on the adaptive-predictive control model parameters, as described in the related patents. This value may be supplied by the complementary operation logic to start or stop the adaptation of the adaptive-predictive control model parameters when the complementary operating logic identifies situations in which adaptation is or is not desirable.

A HS (handshake) input receives a digital signal that, when the value of HS changes from "0" to "1", indicates a new sampling instant, namely the times at which the controller generates a new adaptive-predictive control vector. The HS signal thus distinguishes the times that are adaptive-predictive controller sampling instants from the times at which the complementary operating logic is executed but which are not adaptive-predictive controller sampling instants. When the HS signal is supplied by the complementary operating logic, the complementary operating logic determines the times that are the sampling instants and thus controls the length of the control period.

The outputs of the adaptive-predictive control operator 102 are as follows:

OUT transmits an analog signal representing the present value of the adaptive-predictive control variable calculated at the current sampling instant. This value may be transformed by the complementary operating logic into the process control variable or may be sent directly to a corresponding field system as the process control variable.

Output VOUT (Valid Output) delivers a digital signal that, when set to "1", informs the complementary operating logic that the value of the adaptive-predictive control variable delivered by the OUT output is valid or, when set to "0", that the value is invalid. For the value of adaptive-predictive control to be valid, at the very least, the automatic mode must be selected. Additionally, at the start of a control operation or after reinitialization of the controller, a sufficient number of values of the adaptive-predictive driven variable and a sufficient number of the adaptive-predictive control variables must have been received and stored for the newly generated value of the adaptive-predictive control variable to be valid.

Figure 1B:
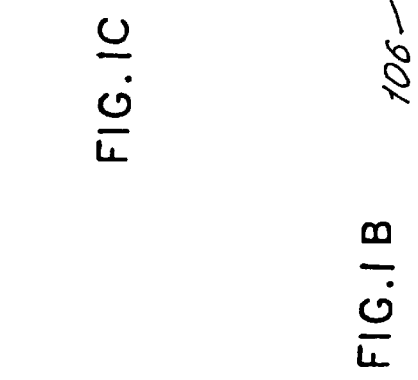

The other adaptive-predictive operators shown in FIGS. 1B–1F are:

An adaptive-predictive control operator 104, shown in FIG. 1B, differs from the controller shown in FIG. 1A in that an additional input, PERT, receives an analog signal representing a perturbation value that affects the value of the adaptive-predictive driven variable and is used by the adaptive-predictive model of the controller.

Figure 1C:

Adaptive-predictive control operator 106, shown in FIG. 1C, represents an adaptive-predictive controller similar to operator 104 but includes two analog inputs PERT1 and PERT2, which have a similar role to the analog input PERT of the operator 104.

It is noted that the control operators 102, 104 and 106 each receive only one adaptive-predictive driven variable and each generates only one adaptive-predictive control variable at each sampling instant. By contrast, the operators 108 and 110, shown in FIGS. 1D–1E, have two analog inputs, PV1 and PV2, which respectively receive the values of two adaptive-predictive driven variables, and have two analog outputs, OUT1 and OUT2, which deliver two adaptive-predictive control variables values that here comprise the adaptive-predictive control vector.

The operators 108 and 110 may each represent a multi-variable adaptive-predictive controller. Alternatively, each operator may represent two adaptive-predictive controllers, each of which receives one of the adaptive-predictive driven variables PV1 and PV2 and each of which generates one of the adaptive-predictive control variables OUT1 and OUT2. A common HS digital input is delivered to the respective HS inputs of the two controllers to ensure that both adaptive-predictive controllers have a common sampling instant so that the values of the adaptive-predictive control vector (which is formed of the two adaptive-predictive control variables) are determined concurrently and by taking into account the respective cross-interactions between input PV1 and output OUT2 and between input PV2 and output OUT1.

The operator 108 differs from operator 110 in that the operator 110 also includes an input PERT used by the adaptive-predictive models.

Figure 1F:
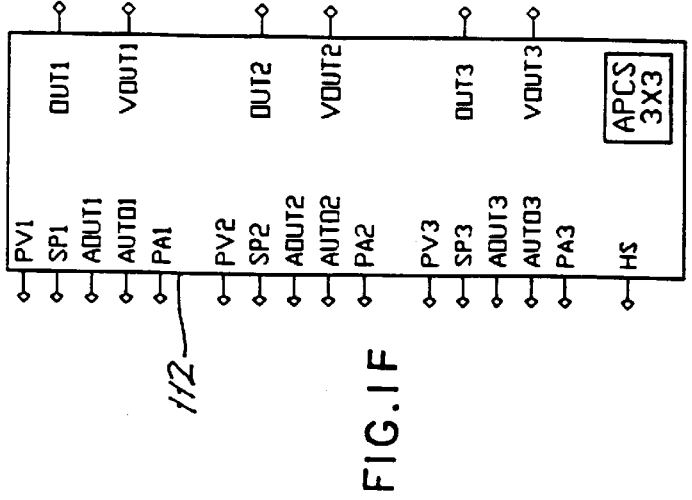
Figure 1E:
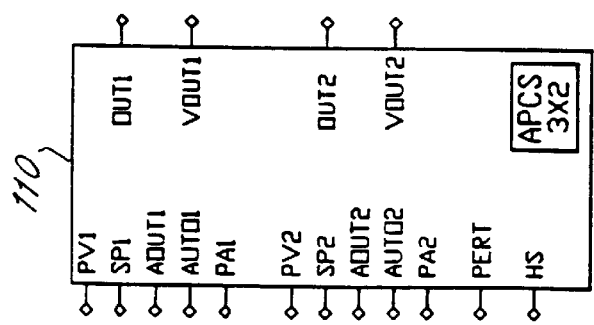
Figure 1D:
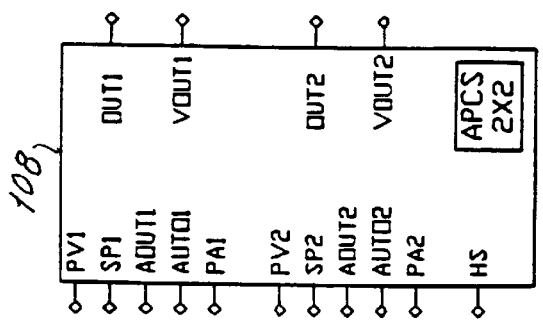

A multivariable adaptive-predictive control operator 112, shown in FIG. 1F, is similar to operator 108 but receives an adaptive-predictive driven vector formed of three adaptive-predictive driven variables and generates an adaptive-predictive control vector comprised of three adaptive-predictive control variables.

As explained in the related patents, the adaptive-predictive controllers also require a set of "structure variables" for initialization. These structure variables may be grouped together and made accessible to the adaptive-predictive controller by an interface (not shown).

FIGS. 2A–2Z show complementary operators that are used to define the complementary operating logic of a control and optimization scheme. The types of complementary operators include: (i) Logic operators having digital input and output variables and which perform a logic function. These operators include combinational gates, such as OR, AND, and NOR gates, as well as sequential logic operators such as flip-flops and counters. (ii) Analog operators in which the I/O variables are analog and which perform simple arithmetic functions, such as addition or subtraction as well as more complex functions, such as integration or filtering. (iii) Mixed operators which utilize both digital and analog I/O variables and which perform simple operations. Included are comparators, pulse width modulators and timers. (iv) Advanced operators which perform complex functions used in advanced process control operations such as performing non-linear functions and software sensors. Examples of the operators used are, but are not limited to, the following:

FIG. 2A shows a CONNECTION LINE 200 that joins an output variable of an operator to an input variable of another operator. The two variables must both be either digital or analog variables. The CONNECTION LINE represents the delivery of a signal transmitted by the output pin of a first operator to the input pin of a second operator and permits the interconnection of operators within a control and optimization scheme. It is noted that only one connection line may be connected to an input but more than one connection line may be connected from an output.

DIGITAL INPUT TERMINAL 202, shown in FIG. 2B, permits the introduction of a digital value into a control and optimization scheme. The terminal 202 is associated with a respective digital variable whose value is transmitted to the output pins 202A.

DIGITAL OUTPUT TERMINAL 204, shown in FIG. 2C, outputs a digital value from a control and optimization scheme. The digital value that is supplied to the input pins 204A represents a digital variable.

FIG. 2D shows an ANALOG INPUT TERMINAL 206 for the introduction of an analog signal into a control and optimization scheme. The terminal 206 is associated with a respective analog variable whose value is delivered to the output pin 206A.

FIG. 2E shows an ANALOG OUTPUT TERMINAL 208 that outputs an analog value from a control and optimization scheme. The analog value is supplied to the input pin 208A.

The above-described terminals define the relationship between a control and optimization scheme and the system variables and allow the interconnection of input and output variables between respective control and optimization schemes or within the same control and optimization scheme when, for visual clarity, it is desirable to not show these connections.

END terminal 210 is shown in FIG. 2F. By convention, the operations represented by the graphical depiction of the control and optimization scheme are executed in order of their position in the control and optimization scheme, namely from the upper portion of the representation. The execution of the remaining portion of the representation of the control and optimization scheme is omitted when the input to this operator receives a value of "1".

FIG. 2G shows a NOT operator 212 in which the inverse of the value received by digital input 212A is delivered to digital output 212B.

AND operator 214, shown in FIG. 2H, delivers to digital output pin 214C the result of a logical AND function performed on two values received at digital inputs 214A and 214B. A "1" is outputted when the two inputs are each supplied with a "1". A "0" is outputted when at least one of the inputs is supplied with a "0".

FIG. 2I shows an OR operator 216 which delivers to digital output 216C the result of a logical OR operation on two values received at digital input pins 216A and 216B. A "1" is supplied when either of the two inputs 216A and 216B receives a "1". A "0" is otherwise outputted.

XOR operator 218, shown in FIG. 2J, performs an exclusive-OR operation on two digital values received at digital inputs 218A and 218B and outputs a "1" whenever the two inputs receive different values, and outputs a "0" otherwise. The output is delivered to digital output 218C.

FIG. 2K shows an ADDER 220 which delivers the sum of two values received by analog inputs 220A and 220B, respectively, to analog output 220C.

SUBTRACTOR 222, shown in FIG. 2L, delivers, to analog output pin 222C, the difference between an analog value received by analog input 222A and a value received by input 222B.

MULTIPLIER 224, shown in FIG. 2M, delivers the product of two values received by analog inputs 224A and 224B to analog output 224C.

DIVIDER 226, shown in FIG. 2N, delivers, to analog output 226C, the quotient of an analog value received by input 226A divided by the value received by input 226B.

FIG. 2O shows the LOGARITHM operator 228 which delivers the base 10 logarithm of the value received by analog input 228A to analog output 228B.

ABSOLUTE VALUE operator 230, shown in FIG. 2P, delivers the absolute value of a value received by analog input 230A to an output 230B.

FIG. 2Q shows a NON-LINEAR FUNCTION operator 232 which delivers to analog output 232B the value determined by a non-linear function on a value received by analog input 232A. The value generated by the non-linear function may be determined by a polynomial curve defined by a table of pairs of values which are grouped in a data structure.

FILTER 234, shown in FIG. 2R, receives, through its analog input 234B, the value of a signal upon which first order linear filtering is carried out and then delivers the value of the filtered signal to analog output 234C. A filter constant is received by analog input 234A.

DERIVATIVE GENERATOR 236, shown in FIG. 2S, delivers, to analog output 236B, the difference between a value received by analog input 236A and a previously received value.

FIG. 2T shows an INTEGRATOR 238 which, whenever a value "0" is received by digital input 238B, delivers to analog output 238C the sum of a value received by analog input 238A and a value that was delivered to analog output 238C during a previous execution of the control and optimization scheme. When the digital input 238B receives a "1", the analog output is set to "0".

LEVEL LIMITER 240, shown in FIG. 2U, restricts a value received by analog input 240B to a range defined by limit values supplied to analog input 240A and to analog input 240C. If the main analog input value exceeds the upper limit, a "1" is delivered to digital output 240D and a "0" to output 240F. If the main analog input is less than the lower limit, a "1" is delivered to digital output 240F and a "0" is delivered to output 240D. If the restricted analog input value is neither greater than or less than the limits, a "0" is delivered to both digital outputs. The restricted analog input value is supplied to analog output pin 240E.

FIG. 2V shows an INCREMENTAL LIMITER 242 which limits a value received by analog input 242B to a range determined by the value previously received by the analog input 242B plus or less an incremental limit value received by analog input 242A. The limit restricted value is delivered by analog output 242D. When the value currently received by analog input 242B is out of the range, digital output 242C outputs a "1". If the value is within the range, a "0" is delivered.

MULTIPLEXOR 244, shown in FIG. 2W, delivers, through analog output 244D, an analog value received by analog input 244A when a "selector" input 244C receives a value "0". The MULTIPLEXOR delivers through the analog output 244D the value received by lower analog input pin 244B when the "Selector" input 244C receives the value "1".

COMPARATOR 246, shown in FIG. 2X, delivers, to digital output 246C, a "1" value when the value received from analog input 246A is greater than the value received by analog input 246B. Otherwise, a "0" value is delivered.

FIG. 2Y shows a PULSE TRAIN GENERATOR 248. When digital input "Reset" 248A receives a "0", a "1" is delivered to digital output 248C during a time period that is equal to 1% of a value received by input "Period" 248B, and a "0" is delivered during the remainder of the period. Analog output "Current Count Status" 248D delivers the time elapsed since the last execution of the control and optimization scheme at which the digital output changed to "1". When the digital input "Reset" 248A receives a "1", outputs 248C and 248D both supply a "0".

FIG. 2Z shows a PULSE WIDTH MODULATOR 250. When digital input "reset" 250B receives a "1", a "0" is delivered to outputs 250D and 250E. When an "0" is received digital output pin 250D delivers a "1" for a time period defined as a percentage of a value received by analog input "period" 250C. The percentage is determined by a value received by analog input "pulse width" 250A. Analog output "Current Count" 250E delivers the time elapsed since the last time that the value supplied to the digital output 250D changed to "1".

It is noted that, as shown in FIGS. 1A–1F and 2A–2Z, the left-most pins in the operator symbols are input variables and the right-most pins are output variables.

To build the control and optimization scheme from the graphical representations, a designer selects the desired graphical operators from the library of operator symbols and then connects their I/O variables in accordance with the control and optimization strategy. The designer selects the adaptive-predictive graphical operators that represent the desired adaptive-predictive controllers and selects the desired complementary operating logic graphical operators to define the complementary operating logic.

The selected adaptive-predictive control graphical operators and the selected complementary operating logic graphical operators determine, through their respective I/O variables, their external relationship to the other selected operators within the control and optimization scheme. Particularly, the operations represented by the selected complementary operating logic graphical operators define the set of input variables supplied to the controllers represented by the selected adaptive-predictive control graphical operators and thus determine the manner in which the adaptive-predictive controllers operate in real time. Similarly, the output variables supplied by the controllers represented by the selected adaptive-predictive control graphical operators are delivered to the operations represented by the selected complementary operating logic operators and determine the form of the process control vector supplied to the process apparatus. Thus, the complementary operating logic graphical operators and their respective input and output variables are selected so that the control and optimization scheme may interact with the process instrumentation, be responsive to the operating conditions, or optimize the process in accordance with the desired process criteria.

Additionally, some of the graphical operators require the setting of internal variables to properly define their operation. As an example, the designer must assign values to the internal structure variables of the adaptive-predictive controllers, as explained in the related patents. The internal variables may include a data structure of historical information of the I/O variables that are needed to execute the operation. As an example, the adaptive-predictive controllers require internal structure variables as well as a data structure of I/O variable historical information that is determined by the internal structure variables (as explained in the related patents). The internal variables are entered by the designer via an interface using standard data entry procedures, and the variables are stored in the computer memory.

Once the designer has built a control and optimization scheme (or a set of control and optimization schemes) using the above-described operators, the designer instructs the system to store this scheme in memory for subsequent compilation. The designer instructs the system to start a standard compilation procedure, which converts-the control and optimization scheme into intermediate code. Each graphical operator is represented by high level programming language instructions. Subsequently, the intermediate code is compiled, namely the sequence of intermediate code instructions is substituted with a corresponding sequence of object code instructions.

The I/O variables of each of the graphical operators have a one-to-one correspondence with the arguments of a subroutine call. As an example, FIG. 2A' shows an alternative graphical representation 260 of an adder operator, operationally similar to ADDER 220 shown in FIG. 2K, that is represented by a subroutine call wherein a and b are analog inputs and c is an analog output. The corresponding intermediate code for this operator may be:

SUM a, b, c,

The intermediate code may be generated in a standard manner using this one-to-one correspondence between the graphically represented I/O variables and the arguments of each operator subroutine, as well as using the interconnections between the respective graphical operators that determine the path of data flow. The types of operator selected also determines the types of variables used, namely whether the arguments are digital or analog.

Accordingly, the intermediate code is generated from the graphical operators comprising the control and optimization scheme by converting the I/O variables of the graphical operators into corresponding arguments of the subroutine calls that correspond to the graphical operators; defining the order of execution of the intermediate code subroutines based on the data paths of the I/O variables; storing internal variables that are entered by the user in free memory buffers; and storing the historical data required by some of the subroutines using a data structure to allocate memory.

The above compilation may use known procedures. The actions that complement and coordinate the compilation are executed using a compiler program to produce the intermediate code that is compatible for different computing environments.

When more than one control and optimization scheme is needed, an intermediate code corresponding to each respective scheme is generated and then arranged in the desired order of execution of the respective control and optimization schemes.

After generating the intermediate code, a set of object code instructions that is specific to a selected computer environment is generated using a compiler program that is likewise specific to the computing environment.

The object code may then be executed periodically. Alternatively, the execution of the object code is event driven to generate the process control vector as needed to drive the process operation in real time.

Therefore, using a computer aided design tool to graphically build a control and optimization scheme and a standard compilation procedure that may be executed in the same computer, the present invention implements the control and optimization scheme in a user-friendly and simple manner. This implementation is also highly reliable because the graphical representation of the control and optimization scheme allows the designer to easily recognize the control and optimization strategy used as well as easily recognize possible mistakes in the control and optimization strategy. The designer may carry out these tasks without having intricate knowledge of either the actual adaptive-predictive controller code or of the complementary operating logic code. Rather, only knowledge of the functions of the operators is needed. Thus, the system designer need only concentrate on the design of the control and optimization strategy and on the graphical definition of the control and optimization scheme and need not actually program the code. The implementation and maintenance of the control and optimization scheme is therefore straightforward, requires less time, is more reliable and, consequently, less expensive.

It should be noted that the computing environment may be a microprocessor that is directly connected through input/output boards to the apparatus that carries out the process or may be a computer connected to an additional system that directly interfaces with the apparatus. It should also be noted that the steps required to implement the building and compilation steps of the APCOS do not necessarily require separate computer systems but, rather, are respective functions that may be carried out by a single computer. Nevertheless, because respective circuit elements of the computer may be utilized to carry out the respective functions, each of these steps can be considered a respective means for carrying out the specific function.

The following examples illustrate applications of graphically defined control and optimization schemes according to the present invention. Included are an example of a control and optimization scheme that controls and optimizes a process, namely, a vessel propulsion system that controls the vessel speed and also optimizes the process by minimizing the fuel consumption by controlling the propeller rotating speed and pitch; an example that controls a process in response to changes in operating conditions, namely a power plant where the superheated steam temperature is maintained regardless of plant load variations; an example in which a complementary operating logic controls a process instrumentation, namely an air conditioning system in which the temperature is controlled by controlling an on/off control valve; and an example of a multivariable process in which more than one value is optimized, namely a distillation column that achieves maximum economic performance while controlling the quality of its bottom product.

EXAMPLE 1

Figure 4A:
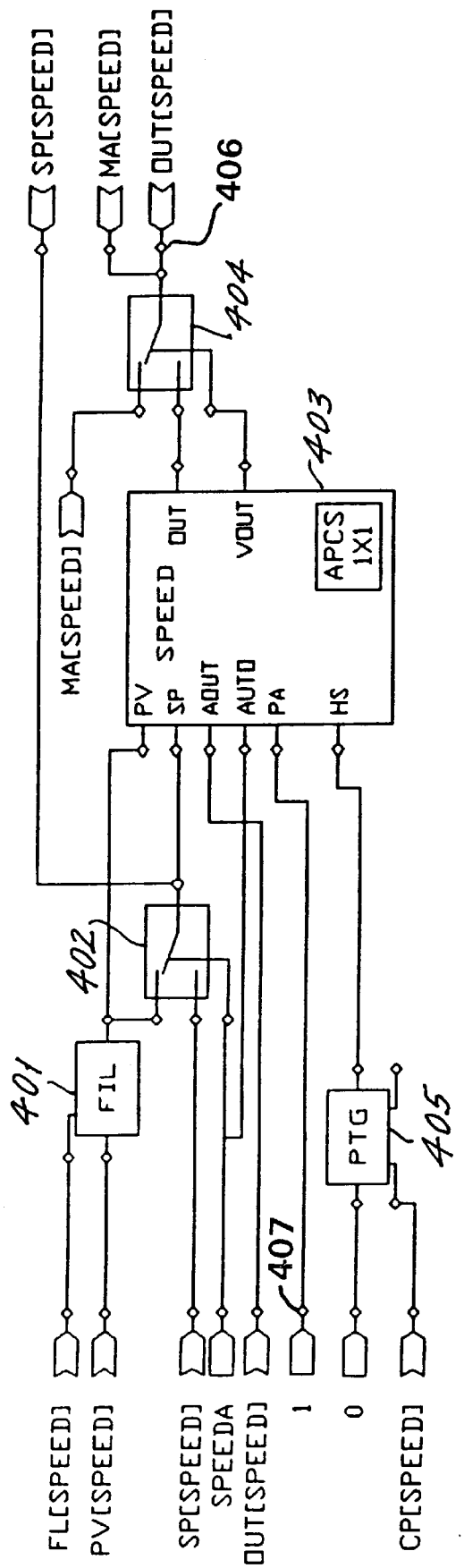
FIGS. 4A–4C are diagrams showing a graphical representation of an example of a control and optimization scheme for controlling propulsion of a vessel.
Figure 4B:
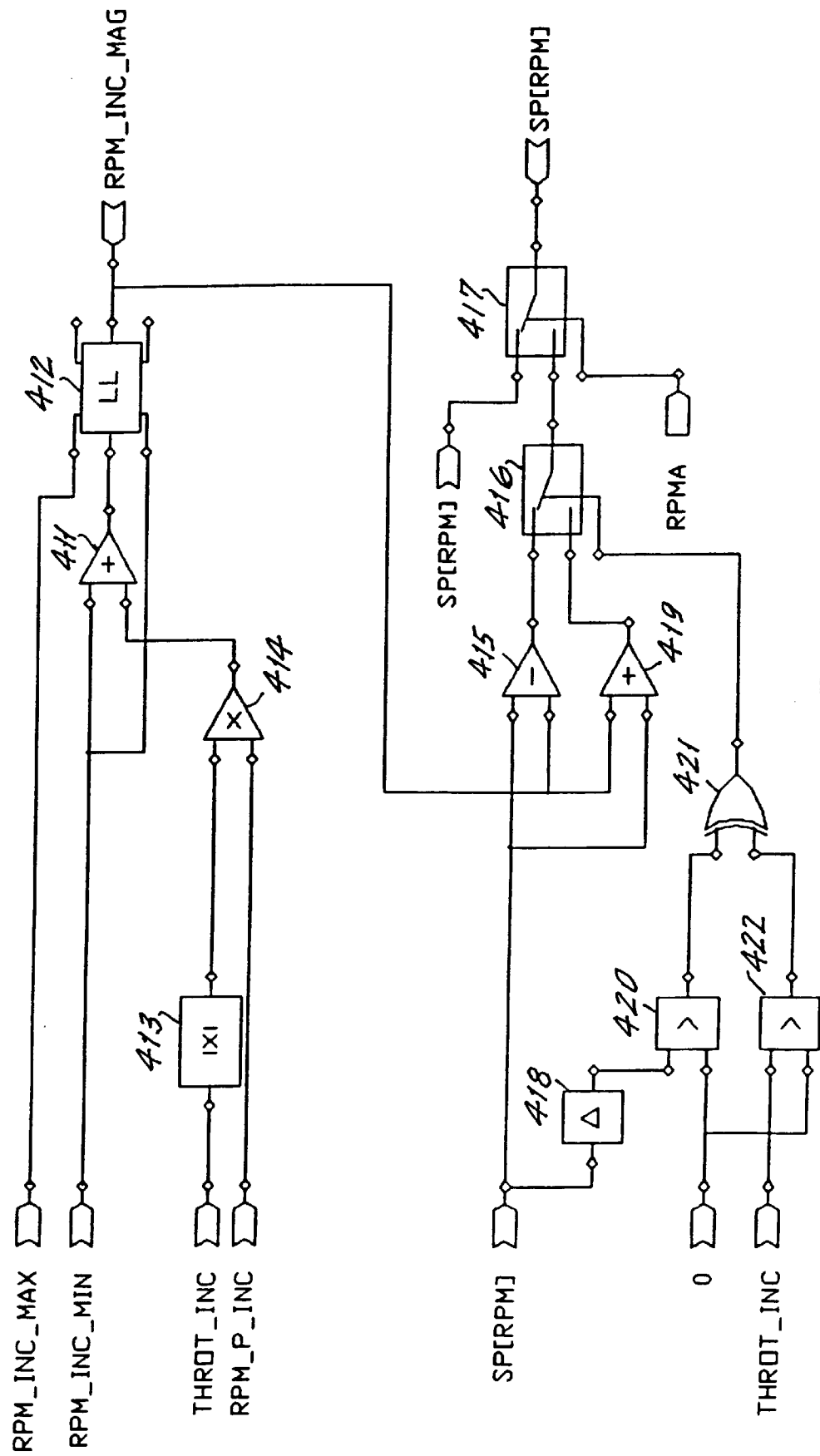
Figure 4C:
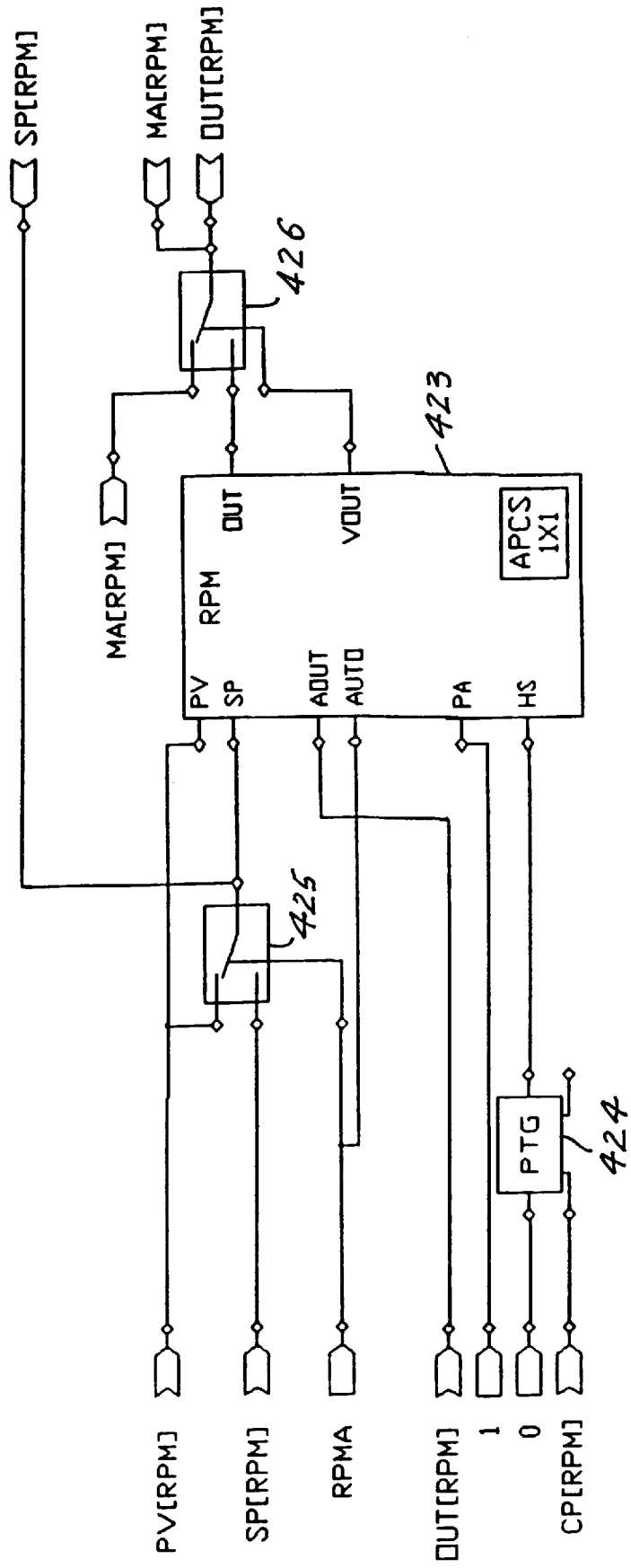

FIGS. 4A–4C depict an example of a graphical representation of a control and optimization scheme that controls the speed of a vessel and, concurrently, optimizes propulsion of the vessel by minimizing its fuel consumption.

The speed of a vessel and the rotary speed of its propeller ("propeller r.p.m.") depend on the throttle, which controls the fuel consumption, as well as on the propeller pitch, which controls the manner in which the power that is applied to the propeller is converted into its rotatory velocity and into the vessel speed, and also depend on other variables such as wind speed, sea currents, and state of the sea. For a particular set of conditions, a steady state vessel speed may be attained using various combinations of steady state values for the throttle and the propeller pitch. However, only one of these combinations of steady state values achieves the minimum fuel consumption. Thus, the objective of the control and optimization scheme is to maintain the desired vessel speed while attaining minimum fuel consumption by finding the appropriate steady state values.

The vessel speed and the rotatory speed of the propeller are each controlled by a respective adaptive-predictive controller. A first adaptive-predictive controller varies the throttle to control the vessel speed. The first controller utilizes a set point that is maintained at a predefined value. A second controller varies the propeller pitch to control propeller r.p.m. A complementary operating logic varies the second adaptive-predictive controller propeller set point to search for the minimum fuel consumption. Though the changes in the propeller r.p.m. change the dynamic conditions of the system, the same vessel speed is maintained by the first adaptive-predictive controller because of its capacity to adapt to new dynamic conditions.

A first goal of the control and optimization scheme is to control the vessel speed. A dynamic process output variable, namely the filtered value of the vessel speed, is obtained from available measurements at each sampling instant. This dynamic process output variable is then driven to the set point value, or maintained at the set point value, during operation in an automatic mode by acting on the process input variable, namely the throttle value. Alternatively, in a manual operating mode, a human operator sets the throttle value while the adaptive-predictive controller continues to perform process identification to be available for a smooth transition to the automatic mode.

FIG. 4A shows an adaptive-predictive controller and complementary operating logic that implement of the first objective. A digital variable "SPEEDA", which is selected by the human operator, is applied to the AUTO input of the adaptive-predictive controller and determines whether the adaptive-predictive controller 403 is in an automatic operating Bode or in a manual mode.

In the automatic mode, in which the value of SPEEDA is "1", a Multiplexor operator 402 selects the set point value that is to be applied to the SP input of the adaptive-predictive controller 403. A measured vessel speed value, PV[SPEED], is supplied to the "analog input terminal" operator of the "filter" operator 401 which, in turn, eliminates the high frequency components. A filter constant FL[SPEED] is available from a configuration window of the computer-aided design tool to allow necessary tuning. The output of the filter 401 comprises the dynamic variable, i.e. the adaptive-predictive driven variable, supplied to the PV input of the adaptive-predictive controller 403.

The AOUT input receives the value OUT[SPEED], namely a value of the process control variable that was generated during an earlier sampling instant, to permit the correct identification function by the adaptive-predictive controller, as explained in the related patents.

The current value of process control variable is delivered by the OUT pin of the adaptive-predictive controller 403 and when selected by the "Multiplexor" operator 404, is sent to the field apparatus through the analog output terminal 406 as output variable OUT[SPEED]. The multiplexor 404 selects this value when the VOUT pin outputs a "1", indicating the validity of the calculated value. Alternatively, when the VOUT pin outputs a "0", the multiplexor 404 outputs the stored value MA[SPEED] as OUT[SPEED]. This value may be initially supplied by a human operator or may initially be equal to the value OUT[SPEED] obtained in an earlier sampling instant and that was previously supplied to analog output terminal 405. In this way, uncontrolled and abrupt changes in the value of the process control variable are avoided, such as when the system changes to the manual mode from the automatic mode.

As noted above, the adaptive-predictive controller 403 operates in a manual mode of operation when the value of SPEEDA is "0". To allow a smooth return to the automatic mode, the measured and filtered dynamic process output variable SP[SPEED] is stored and is then supplied by the "Multiplexor" operator 402 to the SP input of the controller. Upon switching to automatic mode, the set point SP will have a value not far from the current value of the adaptive-predictive driven variable.

A digital input terminal 407 supplies a fixed value "1" to the PA input which allows the adaptive-predictive controller to modify the parameters of the adaptive-predictive control model, such as in the manner described in the related patents. The modification of the adaptive-predictive control model parameters is necessary because of the continuous changes in the process dynamic conditions. These changes may be caused by the search for the optimal operating conditions, such as by changes in propeller r.p.m., or may be caused by unforeseen changes in the values of other process variables.

A pulse train generator operator 405 supplies pulses that are supplied to the HS pin of the adaptive-predictive controller 403 to determine the sampling instants. The period supplied by generator 405 is determined by the value supplied by CP[SPEED] that is determined by the designer using the configuration window. By changing the value by CP[SPEED], the control period of the adaptive-predictive controller, namely the frequency of the sampling instants, may be modified in real time.

A second goal of the control and optimization scheme is to control the propeller r.p.m. A measured dynamic process output variable, namely the measured propeller r.p.m., is obtained at each sampling instant and this value is then driven to a set point value or maintained at the set point value by appropriate action on the process input variable, the propeller pitch, during operation in an automatic mode. The set point value is determined by further complementary operating logic shown in FIG. 4B and described below.

An arrangement of a second adaptive-predictive controller and additional complementary operating logic that controls the propeller r.p.m. is shown in FIG. 4C. This arrangement is analogous to that shown in FIG. 4A except there is no filtering of the measured PV[RPM] variable. Only the differences between FIG. 4A and 4C are now described.

The vessel may be operated in a manual mode in which a human operator sets the propeller pitch value. In the manual mode, the adaptive-predictive controller continues to perform process identification to be ready for a smooth return to automatic operation. The adaptive-predictive controller operates in the manual mode when the value RPMA that is supplied to the adaptive-predictive controller is "0". The controller operates in the automatic mode when the value RPMA is "1".

The OUT[RPM] output supplies the value of the process control variable namely, the propeller pitch, to the field process. This value is also stored as MA[RPM].

The value CP[RPM] is supplied to the input of the "pulse generator" operator 424 which, in turn, determines the control period of the adaptive-predictive controller 423.

A third goal of the control and optimization scheme is to minimize the fuel consumption. To attain this objective, the complementary operating logic changes the value of the propeller r.p.m. set point to minimize the fuel consumption while the adaptive-predictive controller 423 adjusts the propeller r.p.m. value as a function of the new set point. Concurrently, the controller 403 maintains the vessel speed as a function of the vessel speed set point. The complementary operating logic is shown in FIG. 4B.

Here, the-complementary operating logic applies a correction to the propeller r.p.m. set point so that the adaptive-predictive controller changes the propeller pitch to drive the measured propeller r.p.m. towards the new r.p.m. set point. The change in fuel consumption, which is indicated by the throttle variation, is then determined. If the throttle decreases, a new correction in the same direction will be applied to the propeller r.p.m. set point. If the throttle increases, a correction in the opposite direction, i.e., with the opposite sign, is applied to the propeller r.p.m. set point.

The correction applied to the propeller r.p.m. set point is the sum of a minimum value plus an increment that is proportional to the observed throttle variation. By tuning the minimum value and its corresponding proportionality factor, a fast and stable approach to the minimum fuel consumption operation is attained.

The upper portion of the arrangement shown in FIG. 4B illustrates the computation of the magnitude of the correction that is applied to the propeller r.p.m. set point. The minimum increment RPM_INC_MIN, the factor of proportionality RPM_P_INC and an upper limit for the computed increment RPM_INC_MAX are determined by the designer. The variable THROT_INC represents the observed throttle variation and is computed by another complementary operating logic not shown. Using the input variables RPM_INC_MIN, RPM_P_INC, RPM_INC_MAX, and THROT_INC, the complementary operating logic absolute value operator 413, multiplier 414, adder 411 and level limiter 412 generate the magnitude of the correction to the propeller r.p.m. set point.

The sign of the set point correction is calculated from the variables THROT_INC and SP[RPM] by the complementary operating logic derivative generator 418, comparators 422, 420 and OR gate 421. Operator 418 is supplied with the propeller r.p.m. set point SP[RPM] that was computed during a prior execution of the complementary operating logic and determines the increment. Comparators 420 and 422 determine the signs of the measured r.p.m. and throttle increments and respectively deliver either a "1" to indicate a positive change or a "0" as a negative change. The "XOR" operator 421 outputs a "1" when the signs of both increments are not the same, and delivers a "0" otherwise, by which multiplexor 416 determines the sign of the next increment for SP[RPM]. Thus, the sign of the present SP[RPM] correction is the same as that of the previous correction when the throttle has decreased, and the sign of the correction is changed when the throttle has increased.

The corrected value of the propeller r.p.m. set point SP[RPM] is then calculated from the magnitude RPM_INC_MAG, the sign of the SP[RPM] correction delivered by OR gate operator 421, the previous value of the propeller r.p.m. set point SP[RPM] and the value RPMA which indicates the operating mode of the adaptive-predictive controller "RPM". The new value of set point SP[RPM] is calculated by complementary operating logic operators 415, 419, 416 and 417 by which the variable RPM_INC_MAG is respectively added to and subtracted from the previous SP[RPM] value by "adder" operator 419 and by "subtractor" operator 415. From the outputs of operators 419 and 415, the multiplexor 416 selects the new propeller r.p.m. set point value as a function of the sign of the new increment. Multiplexor operator 417 then delivers the new propeller r.p.m. set point value when the value of RPMA is equal to "1", which indicates that the adaptive-predictive controller "RPM" is in the automatic mode. When the value of RPMA is "0", the variable SP[RPM] is maintained at its previously stored value.

Figure 5A:
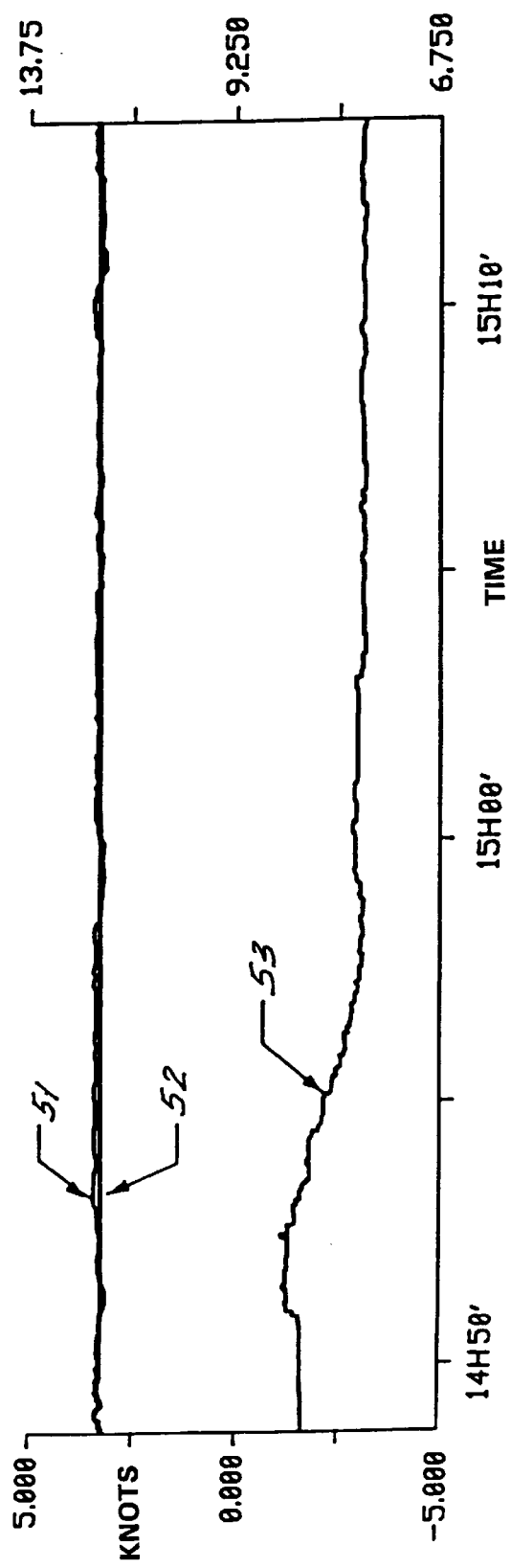
FIGS. 5A–5B are diagrams illustrating the experimental results of the implementation of the scheme of FIGS. 4A–4C.
Figure 5B:
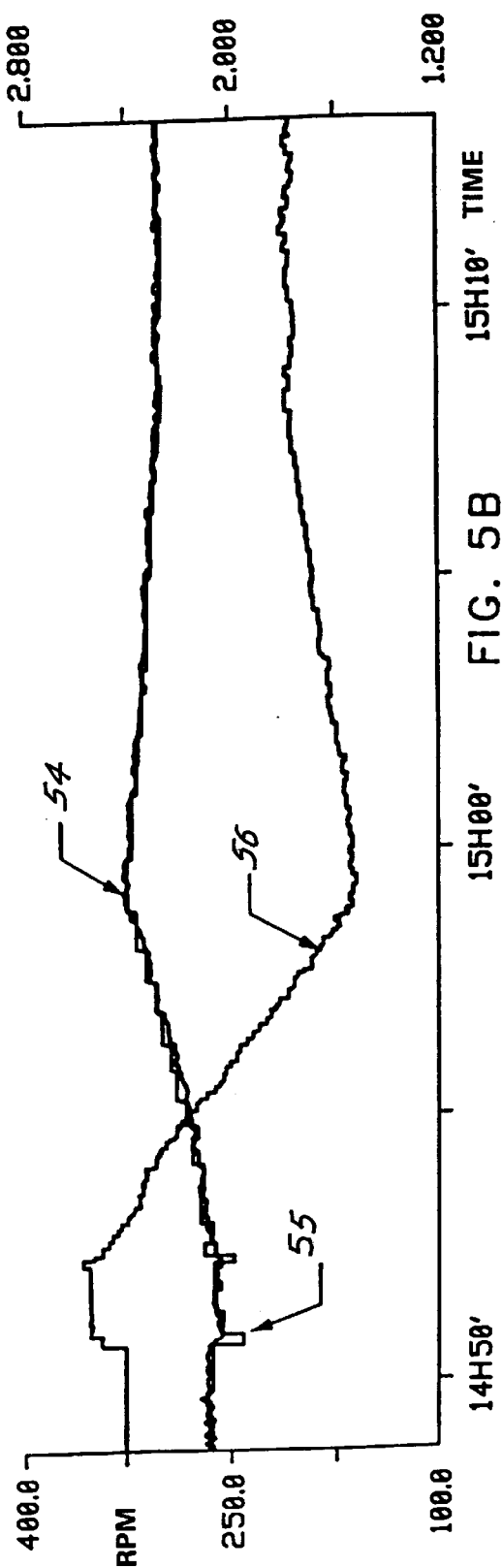

FIGS. 5A–5B show the results of a 25 minute experiment in which the control and optimization scheme described above and shown in FIGS. 4A–4C controls and optimizes a vessel propulsion system by searching for the minimum fuel consumption (i.e., the minimum throttle) while maintaining the vessel speed at its set point.

As shown in FIG. 5A, curve 51 depicts the vessel speed PV[SPEED] in Knots, curve 52 depicts the set point SP [SPEED], and curve 53 represents the throttle OUT[SPEED] in cm, each as a function of time.

As shown in FIG. 5B, curve 54 represents the propeller rotating speed PV[RPM] in revolutions per minute, curve 55 represents its set point SP [RPM], and curve 56 represents the propeller pitch OUT[RPM] in m, each as a function of the time.

The curves show that by varying the propeller r.p.m. as a function of the propeller pitch, the search for the minimum throttle finds and maintains the desired operating criteria, the minimum fuel consumption and precisely controls the vessel speed regardless of any drastic dynamic changes in the process.

EXAMPLE 2

Figure 6A:
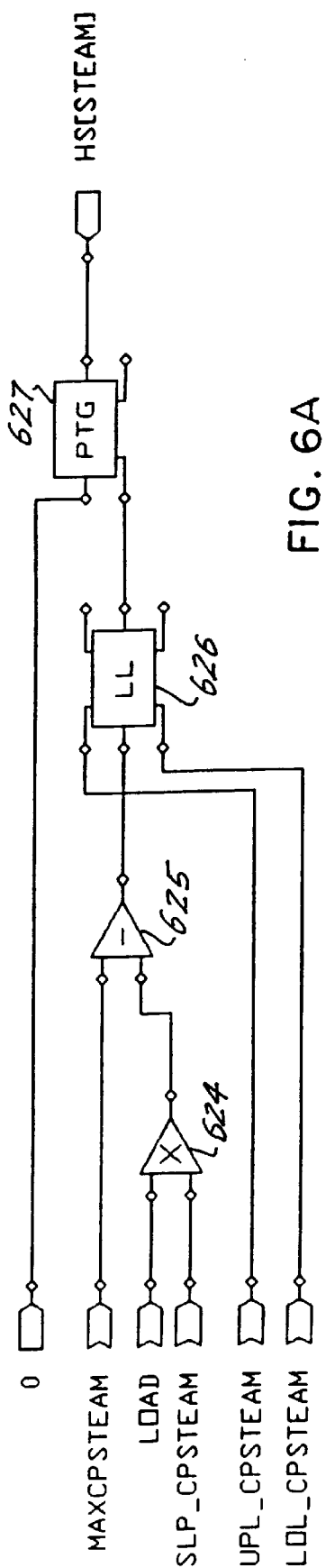
FIGS. 6A–6B are diagrams showing a graphical representation of an example of a control and optimization scheme for controlling the steam temperature in a power plant.
Figure 6B:
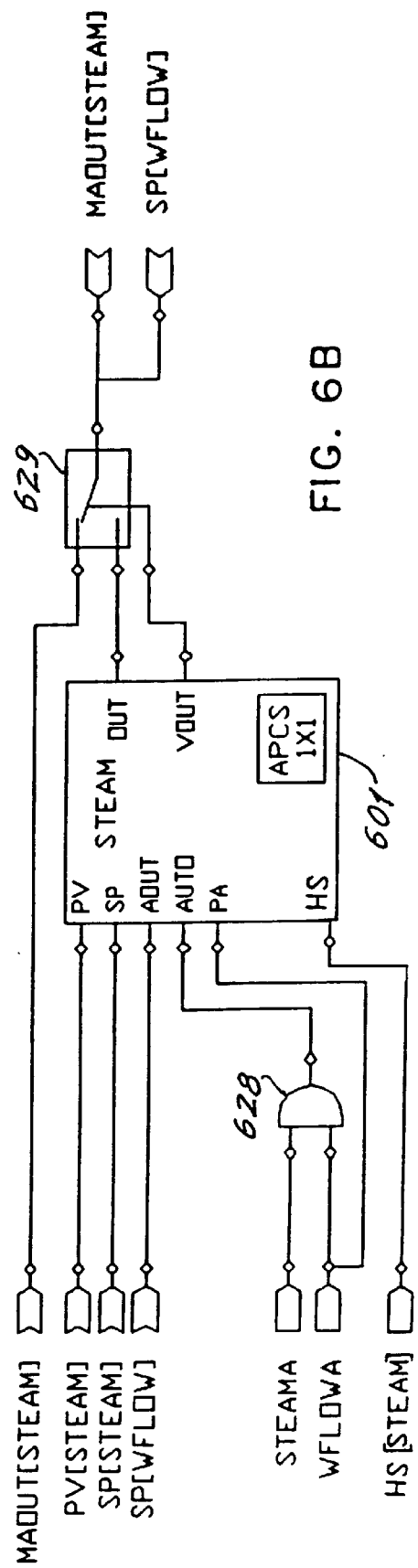

FIGS. 6A–6B show an example of a graphical representation of a control and optimization scheme for controlling the superheated steam temperature in a power plant. In a thermal power plant, the steam supplied by a drum, after being heated in a boiler, is tempered by a flow of water controlled by a tempering valve. The resulting superheated stream is then supplied to a turbine.

The superheated steam temperature must be precisely controlled because of the great risk of thermal fatigue caused by continuous temperature oscillations and caused by significant variations from the temperature set point that may damage the turbine and reduce its life expectancy. The dynamics of the process, however, may change drastically with the plant load, namely with the generated power. The generated electrical power is proportional to the steam flow rate under similar operating conditions, and as a consequence: (i) Because the speed of the steam passing through the temperer is proportional to its flow rate, there may be significant variations in the tempering process time delay when the plant load changes. This time delay is inversely proportional to the plant load. (ii) The process time constants will decrease as the steam speed increases. (iii) The refrigerating effect of the tempering water flow rate decreases as the steam flow increases. When the plant load changes, because of drastic dynamic variations resulting from load changes, it is difficult to precisely control the superheated steam temperature using adaptive-predictive control without the inclusion of complementary operating logic.

The control and optimization scheme of this example precisely controls the superheated steam temperature irrespective of changes in the plant load during its operation.

Ordinarily, when an adaptive-predictive controller is used to regulate the superheated steam temperature, the variations in plant load levels cause the adaptive-predictive control model parameters to vary significantly when a constant control period is used. These variations are caused by the above-described changes in the process dynamics.

By contrast, if the length of the control period were to be adjusted to change inversely with the changes in the plant load, the variations in the adaptive-predictive control model parameters would be considerably smaller. The use of a changing control period length thus essentially compensates for variations in the adaptive-predictive control model parameters that are caused by the plant load changes when a fixed control period is used.

Therefore, the control and optimization strategy implemented by this control and optimization scheme relies on an adaptive-predictive controller that controls the superheated temperature but which operates with a control period that changes in real time such that the control period linearly decreases with increases in the plant load and linearly increases with decreases in plant load. In this manner, the adaptive-predictive controller adjusts the adaptive-predictive control model parameters much more accurately than if the control period were a constant value. As a result, the predictions performed using the adaptive-predictive model are more accurate and the resulting control precision is greatly improved.

FIGS. 6A–6B show a graphical representation of a control and optimization scheme that implements this strategy. The goals of the control and optimization scheme and its implementation are now described.

A first goal of the control and optimization scheme is to calculate the control period for the adaptive-predictive controller. The control period is equal to a predefined value less a decrement that is proportional to the plant load. By tuning the predefined value and its corresponding decrement, the dynamic changes in the process can be compensated.

The complementary operating logic that implements this objective is represented in FIG. 6A. The predefined value MAXCPSTEAM, a proportionality factor SLP_CPSTEAM, and the control period upper and lower limits UPL_CPSTEAM and LOL_CPSTEAM are selected by a human operator. The variable LOAD represents the current measured plant load. Using these variables, a multiplier 624, a subtractor 625 and a level limiter 626 generate a value that is converted by the pulse train generator 627 into a train of pulses HS[STEAM]. The pulses HS[STEAM] are supplied to input HS of a first adaptive-predictive controller 601, shown in FIG. 6B, to regulate the control period of the adaptive-predictive controller.

A second goal of the control and optimization scheme is the generation of the adaptive-predictive process control variable that regulates the superheated steam temperature. A dynamic process output variable, namely the measured superheated steam temperature, is supplied to the first adaptive-predictive controller 601, shown in FIG. 6B. The first adaptive-predictive controller then generates a first process control variable that is supplied to the set point input of a second adaptive-predictive controller (not shown). The second adaptive-predictive controller is arranged in cascade with the first adaptive-predictive controller and regulates the tempering water flow. When operating in an automatic mode, the second controller delivers a second adaptive-predictive process control variable that represents a control signal that is supplied to the tempering valve.

It should be noted that the first adaptive-predictive controller does not operate in an automatic mode or in an identification mode when the second adaptive-predictive controller is in a manual mode. This is because the first process control variable generated by the first adaptive-predictive controller is useless when the second adaptive-predictive controller is in the manual mode. Therefore, the digital variable "WFLOWA" that is supplied to the first adaptive-predictive controller is set to "0" when the second adaptive-predictive controller is operating in the manual mode. Conversely, the value WFLOWA is set to "1" when the second controller operates in the automatic mode.

The value of a digital variable "STEAMA" is selected by a human operator and is supplied with the value of "WFLOWA" as inputs to an AND operator 628 which delivers its output to the AUTO input of the first adaptive-predictive controller 601 to determine the operating mode. When the values of STEAMA and WFLOWA are both equal to "1", the adaptive-predictive controller 601 operates in the automatic mode.

The dynamic process output variable PV[STEAM] that is supplied from the field is supplied to the PV input of the first controller.

The AOUT input of the first controller receives the value of the second adaptive-predictive controller set point SP[WFLOW]. This value is calculated during a prior execution of the control and optimization scheme.

The HS input receives the pulse train variable HS[STEAM] that is generated by the complementary operation logic shown in FIG. 6A. This value determines the control period of the first adaptive-predictive controller.

When the first adaptive-predictive controller 601 is in automatic mode, the value supplied by the VOUT pin is set to "1" and delivered to the multiplexor 629. As a result, the multiplexor sets the current value of the process control variable SP[WFLOW] to the value of the variable supplied by the OUT pin of the first controller. Alternatively, when the value supplied by the VOUT pin is "0", the multiplexor 629 sets the current value of SP[WFLOW] to the value of the variable MAOUT[STEAM] which is determined by a human operator. A value for SP[WFLOW] is then stored as MAOUT[STEAM] to ensure a smooth transition when the first controller changes from manual mode to automatic mode.

FIGS. 7A–7C illustrate a time interval in which the control and optimization scheme of FIGS. 6A–6B controls the superheated steam temperature of a power plant. Here, the plant load changes from a minimum operating value (105 MW) to a full load value (214 MW). The control period is varied in the manner previously explained.

In FIG. 7A, curve 71 represents the steam temperature PV[STEAM] (in degrees Celsius) and curve 72 represents the set point SP[STEAM]. In FIG. 7B, curve 73 represents the tempering water flow rate SP[WFLOW] (in TM/H), and in FIG. 7C, curve 74 represents the plant load (in MW). In each curve, the X-axis represents the time in hours and minutes.

As shown therein, the steam temperature is precisely controlled as the plant load changes from its minimum value to its maximum value. As curve 73 shows, the control period, which determines the frequency of the sampling instants, varies from 40 seconds at the minimum load to 20 seconds at the full load. During this interval, the steam temperature does not significantly deviate from the set point value, as curve 71 shows.

Thus, the complementary operating logic, by appropriately varying the control period, enables the adaptive-predictive controller to accurately control the process output variable regardless of the changing process conditions. By appropriately varying the control period, the adaptation carried out by the adaptive-predictive controller is more accurate and better controls the process.

EXAMPLE 3

Figure 8:
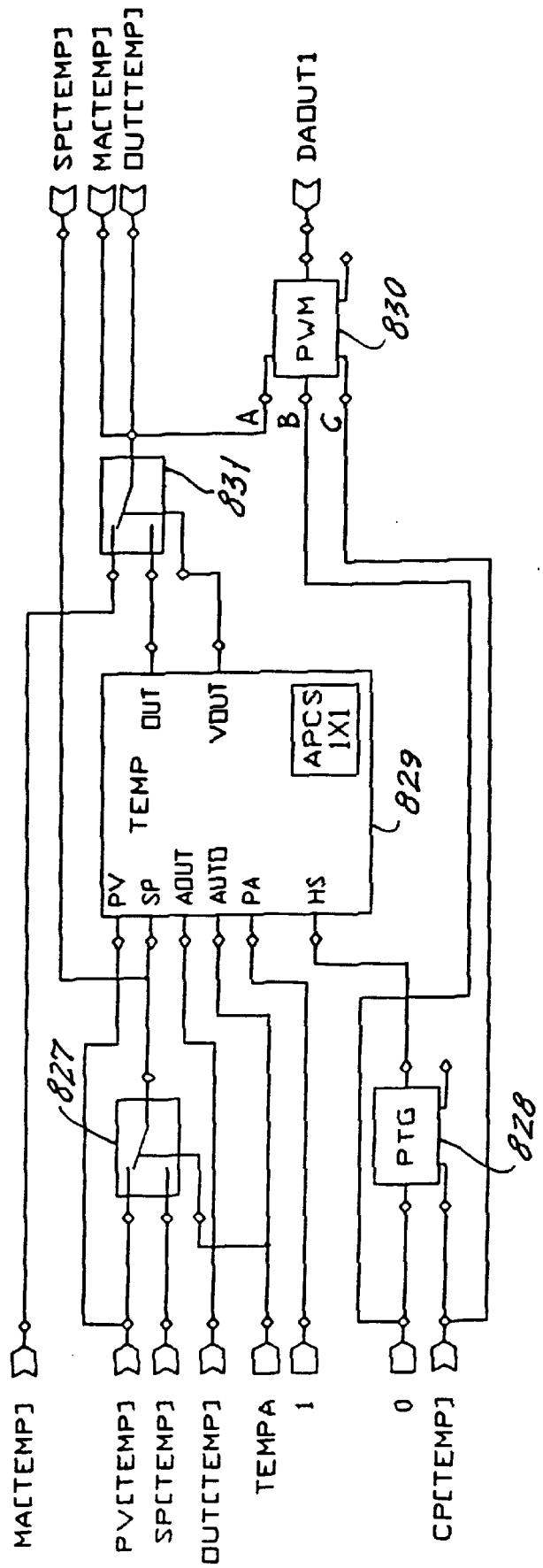
FIG. 8 is a diagram showing a graphical representation of an example of a control and optimization scheme that controls an air conditioning process.

FIG. 8 shows a graphical representation of a control and optimization scheme for an air conditioning control system that controls the temperature of a room using an on-off actuator.

In this example, an air conditioning system controls the temperature of a room using a three way valve of an air-conditioning fan-coil. The valve includes an "on" position in which cooling fluid is sent through the compressor and includes an "off" position in which the fluid bypasses the compressor. Because the valve uses an on-off operation, the valve may be controlled by a digital (on-off) signal but cannot be directly controlled using an analog signal. To precisely control an analog value, such as the room temperature, however, an analog control variable is needed. The air conditioning actuators that respond to analog control signals, however, are considerably more expensive than this digitally controlled on-off valve. It is therefore preferable to use an analog variable to control the on-off valve.

To control the on-off valve using an analog variable, the analog control action of each control period must be defined as the percentage of time of the control period in which the valve is held in its on-position, which is defined as the valve-on time percentage. As an example, a zero valve-on time percentage indicates that the valve is off during the entire control period, and a 100 percent valve-on time percent indicates that the valve is continuously on. The control and optimization scheme that controls the air conditioning system utilizes an adaptive-predictive controller that uses the measured room temperature, that is to say uses the dynamic process output variable as the adaptive-predictive driven variable and uses the valve-on time percentage as the adaptive-predictive control variable.

The first goal of the control and optimization scheme is to generate a process control variable by which the room temperature may be regulated. The arrangement of an adaptive-predictive controller and pre-controller complementary operating logic that attains this goal is represented by the graphical operators shown in FIG. 8 excluding the operator 830, which serves as post-controller complementary operating logic. The operation of the arrangement is analogous to that shown in FIG. 4C, and only the specific differences will now be described.

As FIG. 8 shows, the value PV[TEMP] represents the dynamic process output variable or the adaptive-predictive driven variable, namely the measured room temperature, and is supplied to multiplexor 827 and to input PV of the controller 829.

The value TEMPA determines whether controller 829 is in the automatic operating mode or in the manual mode. The value of set point SP[TEMP] is defined by a human operator and supplied to multiplexor 827.

The value OUT[TEMP] variable represents the adaptive-predictive control variable, namely, the valve-on time percentage. The adaptive-predictive control variable is also stored as the value MA[TEMP].

The value CP[TEMP] is supplied to "pulse generator" operator 828 to regulate the control period of the adaptive-predictive controller 829. The control period is set by the system designer.

A second goal of the control and optimization scheme is to use complementary operating logic to convert the adaptive-predictive control vector supplied by the adaptive-predictive controller 829, namely, the valve-on time percentage, to a real time valve-on digital signal that is transmitted to the valve to control its on and off position.

The valve-on time percentage, namely, the value OUT [TEMP], is supplied to input A of the pulse width modulator operator 830 which generates a digital process control signal DAOUT1 which, in turn, controls the on-off position of the valve. The control period of the pulse width modulator 830 is determined by the signal CP[TEMP] that also determines the control period of the adaptive-predictive controller 829.

Thus, the complementary operating logic enables the adaptation of the adaptive-predictive control signals generated by the adaptive-predictive controller into signals that can be used by the process instrumentation. By enabling the use of a digital actuator rather than an analog actuator, there is significant savings in instrumentation costs.

Figure 9A:
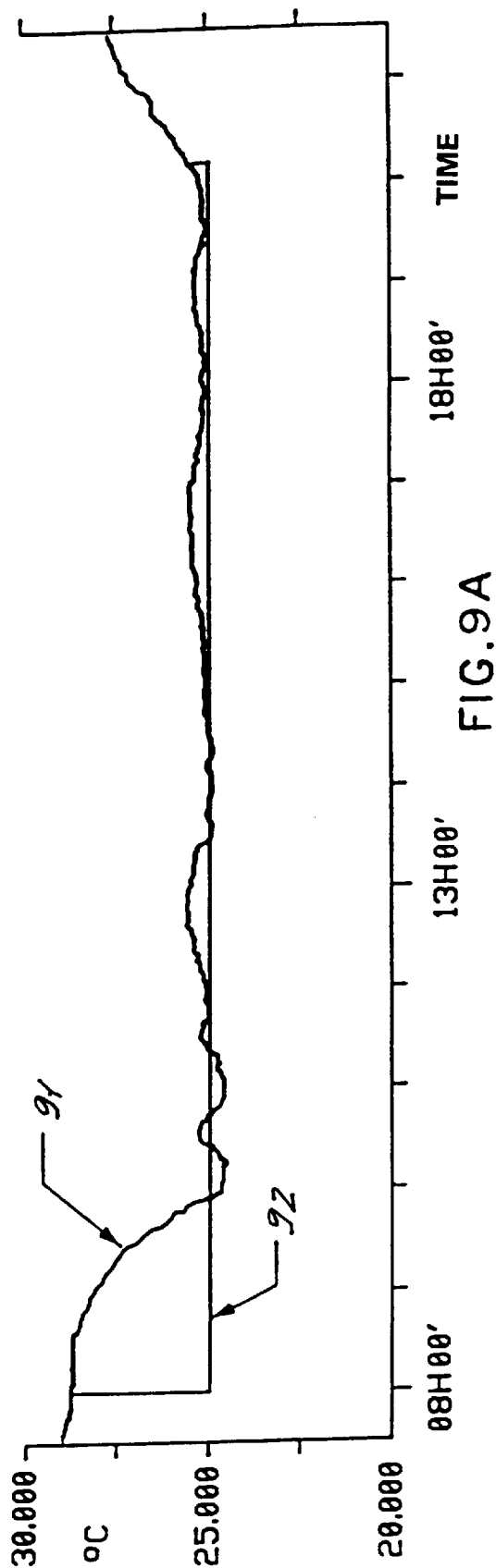
FIGS. 9A–9B are diagrams illustrating the experimental results of the implementation of the scheme of FIGS. 8.
Figure 9B:

FIGS. 9A–9B illustrate an example of the operation of the control and optimization scheme shown in FIG. 8. Here, the room temperature is controlled from the time the air conditioning system is activated, 8:00 a.m., until the time the system is deactivated, 8:10 p.m.

FIG. 9A shows curve 91 which represents the measured room temperature PV[TEMP] and curve 92 which represents its set point SP[TEMP] (both in degrees Celsius). The valve-on time percentage OUT[TEMP] (in %) is represented by curve 93 of FIG. 9B. In each of curves 91, 92 and 93, the X-axis represents the time in hours and minutes.

As curves 91 and 92 show, the room temperature PV[TEMP] is driven to a precisely controlled value that does not significantly deviate from the set point SP[TEMP].

EXAMPLE 4

Figure 10A:
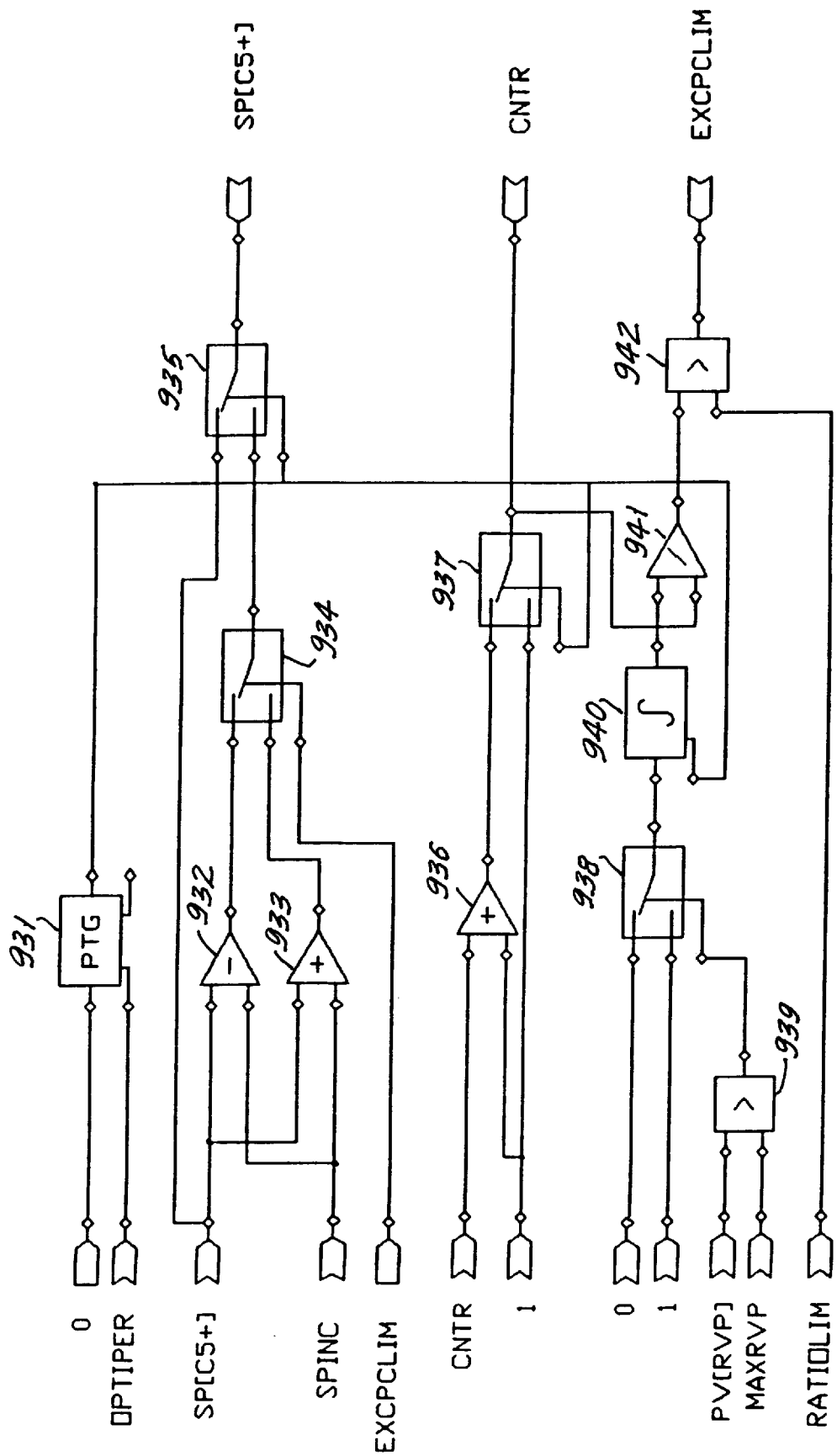
FIGS. 10A–10B are diagrams showing a graphical representation of an example of a control and optimization scheme that controls a multivariable distillation column.
Figure 10:
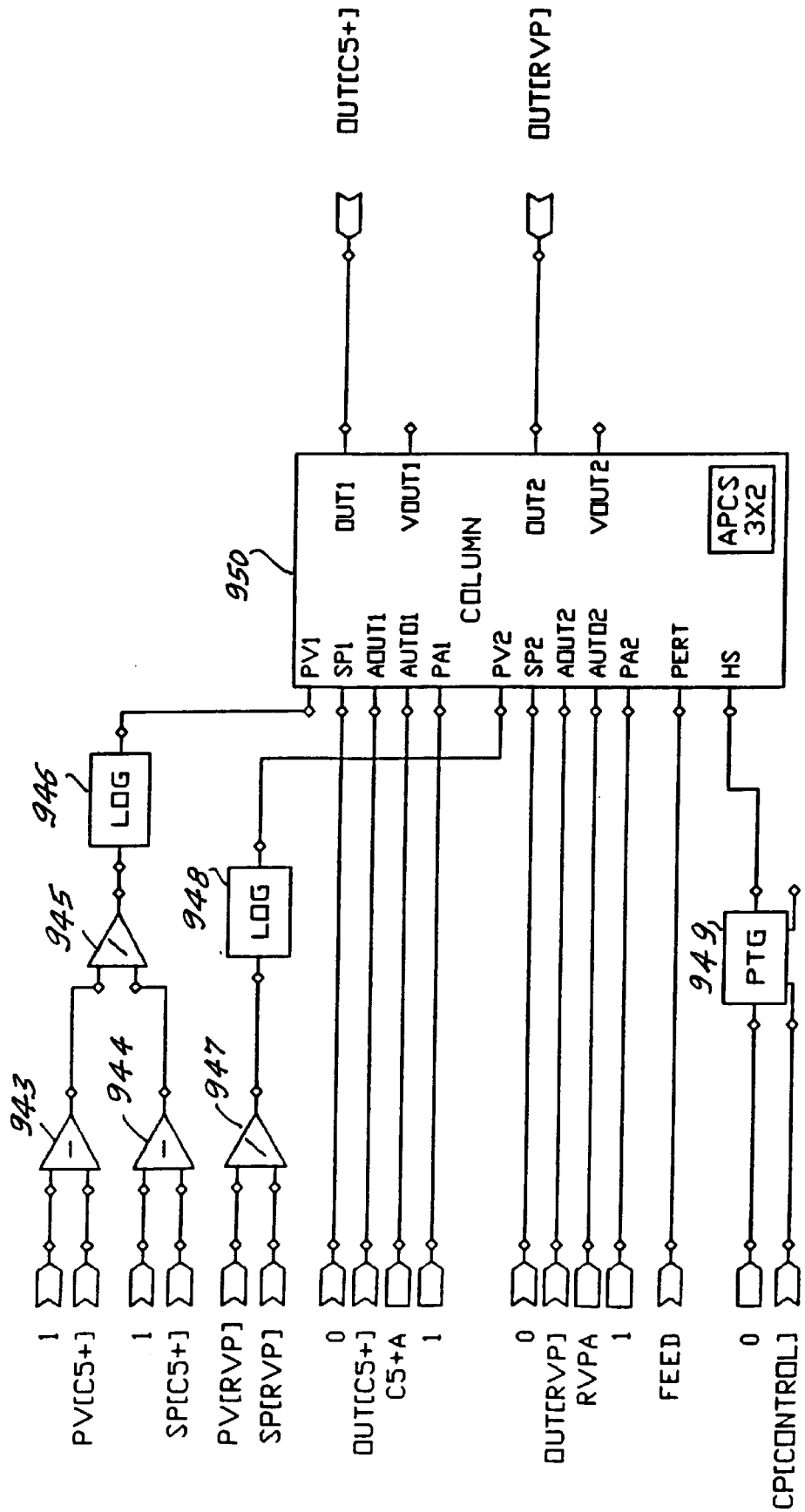

FIGS. 10A–10B show an example of a graphical representation of a control and optimization scheme that maximizes the economic performance of a naphtha distillation column using multivariable control of the composition of the top product, Liquified Petroleum Gases (LPG), and the Reid Vapor Pressure (RVP) of the bottom product (refined naphtha).

In this example, unrefined naphtha enters the distillation column and is separated into two fractions. The light components comprises a top product, and the refined naphtha comprises a bottom product. The refined naphtha has the greater economic value but must comply with various specifications related to the maximum RVP value. The top product, by contrast, is characterized by its $C_5+$ concentration, namely the hydrocarbons with 5 or more carbons per molecule. As is known, the operation of the distillation column is a highly non-linear multivariable process. In the present example, when the $C_5+$ concentration in the top product decreases, the RVP tends to increase. Thus, it is desirable to achieve the maximum economic performance of the process by controlling the top product composition and the RVP bottom product so that the $C_5+$ concentration in the top product is at a minimum while the measured RVP of the bottom product does not exceed a predetermined maximum RVP value for more than a predetermined percentage of times.

The control and optimization scheme accomplishes this by controlling the reflux flow rate of the top product and the steam heating flow rate of the bottom product. Because of the multivariable interactive nature of the distillation column, each of these control actions affects both the $C_5+$ concentration and the RVP. Thus, the $C_5+$ concentration in the top product (in percentage) and the RVP (in Kg/cm2) of the bottom product must be controlled using a 3×2 (3 input, 2 output) multivariable adaptive-predictive controller.

Because of the non-linear behavior of this process, it has been shown that the best experimental results are obtained when the two process output variables are transformed by a complementary operating logic into two adaptive-predictive driven variables. A first adaptive-predictive driven variable is best defined as:

$$\log\left(\frac{(100 - \text{measured } C_5+ \text{ concentration})}{(100 - \text{process set point for the } C_5+ \text{ concentration})}\right),$$

and a second adaptive-predictive driven variable is best defined as:

$$\log\left(\frac{(\text{measured } RVP)}{(\text{process set point for the } RVP)}\right),$$

where the corresponding set points for the adaptive-predictive driven variables are set equal to "0". The feed flow rate is also supplied to the controller and is treated as a perturbation.

The adaptive-predictive control variables generated by the adaptive-predictive controller are: (i) the reflux flow rate, and (ii) the steam flow rate.

To optimize the process, a complementary operating logic adjusts the $C_5+$ concentration set point to maximize the bottom product flow rate. At the same time, the adaptive-predictive controller maintains the above-described requirements for the top product composition and the bottom product RVP. The set point for the $C_5+$ concentration is lowered as long as the percentage of measurements of the RVP that exceed the predetermined maximum value during an optimization time period is less than a predefined maximum value. When the value is exceeded, the set point for the $C_5+$ concentration is raised.

A first goal of the control and optimization scheme is to determine the set point for the $C_5+$ concentration at regular intervals. At the end of a predefined optimization interval, a new $C_5+$ concentration set point is determined by subtracting an "increment" value from the previous set point value when the percentage of RVP measurements that are below a predetermined minimum value has not exceeded a predefined maximum during this time interval. When the maximum percentage is exceeded, the new set point is the sum of the previous set point value and the increment value. To determine whether the predefined maximum percentage has been exceeded, complementary operating logic counts the number of measurements that are less the predetermined minimum RVP value within the interval.

The graphical representation of the complementary operating logic that attains this goal is shown in FIG. 10A. Pulse train generator 931 generates a value "1" at the beginning of each optimization interval. The length of the optimization interval is supplied by the input value OPTIPER that is set by a human operator.

The value of the set point SP[C5+] that was determined during the previous optimization interval, a selected increment value SPINC and a value indicating whether the percentage of RVP measurements that are below a predetermined minimum value exceeded maximum percentage in the previous optimization interval EXCPCLIM, are supplied to the complementary operating logic. From the values, an adder 932, a subtractor 933, and multiplexors 934 and 935 generate a new set point at the start of each optimization interval.

The adder 936 and multiplexor 937 determine the number of executions CNTR of the control and optimization scheme since the beginning of the current optimization interval. The comparator 939 determines whether the current measured RVP has exceeded a predetermined maximum value MAXRVP, and, if so, the number of times that MAXRVP has been exceeded since the start of the current optimization interval is determined by multiplexor 938 and integrator 940. Divider 941 determines the ratio between the number of times that the minimum RVP value has been exceeded in the current optimization interval and the value CNTR. This ratio is compared to the permitted ratio RATIOLIM by comparator 42 which determines whether the predetermined maximum percentage has been exceeded. The result EXCP-CLIM is then stored for the next execution of the control and optimization scheme.

A second goal of the control and optimization scheme is the generation of the process control variables that regulate the $C_5+$ concentration and the RVP. The values of the dynamic process output variables, namely the $C_5+$ concentration and the RVP, are first transformed as described above by the complementary operating logic. The set points input pins of the adaptive-predictive controller 950 are supplied with the value "0". The controller 950 is also supplied with the feed flow rate as a perturbation value. Two adaptive-predictive control variables are generated by the adaptive-predictive controller and comprise the adaptive-predictive control vector.

An arrangement of an adaptive-predictive controller with further complementary operating logic that attains this second goal is shown in FIG. 10B. Subtractors 943, 944, divider 945 and logarithm operator 946 generate the first, adaptive-predictive driven variable from the first dynamic process output variable PV[C5+] and the set point SP[C5+]. Divider 947 and logarithm operator 948 generate a second adaptive-predictive driven variable from the second dynamic process output variable PV[RVP] and the second set point value SP[RVP]. The two adaptive-predictive driven variables are respectively supplied to inputs PV1 and PV2 of the multivariable adaptive-predictive controller 950.

The inputs AOUT1 and AOUT2 respectively receive the values of the adaptive-predictive control variables OUT[C5+] and OUT[RVP] that were generated during a previous execution of the adaptive-predictive controller. The measured value of the feed flow rate FEED is supplied to the perturbation input PERT.

The digital variables $C_5+A$ and RVPA, which are defined by a human operator, are respectively supplied to inputs AUTO1 and AUTO2 to determine whether the adaptive-predictive controller operates in the automatic mode or manual mode.

The controller input pins PA1 and PA2 are supplied with the constant value "1" so that the adaptive-predictive model and its parameters within the adaptive-predictive controller vary, as described in the related patents. Analog inputs SP1 and SP2 receive the constant value "0", as described above.

The pulse generator operator 949 generates pulses that are supplied to the HS pin to define the sampling instants.

Thus, a control and optimization scheme is implemented that both generates an adaptive-predictive control vector that controls plural dynamic process output variables using a multivariable adaptive-predictive controller and that optimizes the process using a complementary operating logic.

The present invention may be embodied in other specific forms without departing from the spirit or essential attributes thereof and, accordingly, reference should be made to the appended claims, rather than to the foregoing specification as indicating the scope of the invention.

What is claimed is:

1. A method of designing a control and optimization scheme for generating a process control vector during each of a plurality of sampling instants, said process control vector comprising at least one process control variable and being applied to an apparatus which carries out a process having at least one process input variable and at least one process output variable, said at least one process input variable defining a process input vector and said at least one process output variable defining a process output vector, said apparatus varying said process input vector as a function of said process control vector, said method comprising the steps of:

(A) defining at least one controller for predicting a value of a driven vector during at least one future sampling instant, said driven vector being comprised of said at least one driven variable, said at least one controller generating, at each of said sampling instants, an outputted control vector that drives said value of said predicted driven vector to satisfy a predefined controller performance criterion at said at least one future sampling instant;

(B) selecting at least one complementary operating logic operation; and (C) combining said at least one controller with said at least one complementary operating logic operation to control said process in accordance with at least one predefined process performance criterion;

said at least one complementary operating logic operation being selected such that when said at least one complementary operating logic operation is combined with said controller, said controller operates in such a manner that said process is optimized in accordance with said at least one predefined process performance criterion.

2. The method of claim 1, wherein said step of defining at least one controller includes selecting, using a computer aided design tool, one from a first group of graphical input/output operators each representing a respective type of controller operation.

3. The method of claim 2, wherein said step of selecting, using said computer aided design tool, at least one complementary operating logic operation includes selecting one from a second group of graphical input/output operators each representing a respective complementary operating logic operation.

4. The method of claim 3, wherein each of said first and second groups of graphical input/output operators includes at least one input and at least one output, and said step of combining said at least one controller with said at least one complementary operating logic operation includes defining at least one interconnection between a respective one of said at least one input or said at least one output of the selected one of said first group of graphical input/output operators with a respective one of said at least one input or said at least one output of the selected one of said second group of graphical input/output operators.

5. The method of claim 4, further comprising the step of generating, from the selected ones of said first and second groups of graphical input/output operators and said at least one interconnection, an intermediate code suitable for execution in at least one computing environment.

6. The method of claim 5, further comprising the step of compiling said intermediate code to generate an object code suitable for execution in a respective computing environment.

7. The method of claim 1, wherein said selecting step includes selecting said at least one complementary operating logic operation such that when said at least one complementary operating logic operation is combined with said controller, said controller generates said outputted control vector that optimizes said process in accordance with said at least one predefined process performance criterion.

8. The method of claim 1, wherein said selecting step includes selecting said at least one complementary operating logic operation that is responsive to at least one process operating condition.

9. The method of claim 8, wherein said at least one predefined process performance criterion is an optimum value of said at least one process operating condition, and said combining step combines said at least one controller with said at least one complementary operating logic operation such that said controller generates said outputted control vector that enables said at least one process operating condition to approach said optimum value.

10. The method of claim 8, wherein said at least one predefined process performance criterion is a change in said at least one process operating condition, and said combining step combines said at least one controller with said at least one complementary operating logic operation such that said controller generates said outputted control vector as a function of said change in said at least one process operating condition.

11. The method of claim 1, wherein said at least one predefined process performance criterion is the control of at least one process instrumentation, and said selecting step selects said at least one complementary operating logic operation that controls said at least one process instrumentation.

12. The method of claim 1, wherein said selecting step includes selecting said at least one complementary operating logic operation that varies the value of a set point for said at least one controller.

13. The method of claim 1, wherein said selecting step includes selecting said at least one complementary operating logic operation that varies the value of a control period for said at least one controller.

14. The method of claim 1, wherein said selecting step includes selecting said at least one complementary operating logic operation that controls an actuator.

15. The method of claim 1, wherein said selecting step includes selecting said at least one complementary operating logic operation that operates as a function of at least one measured value.

16. The method of claim 1, wherein said selecting step includes selecting said at least one complementary operating logic operation that transforms said process output vector into said driven vector.

17. The method of claim 1, wherein said selecting step includes selecting said at least one complementary operating logic operation that transforms said outputted control vector into said process control vector.

18. The method of claim 17, wherein said apparatus carries out a simulated process and generates, using said simulated process, said process output vector in response to said process control vector that is generated by said at least one complementary operating logic operation.

19. The method of claim 1, wherein said selecting step includes selecting said at least one complementary operating logic operation that includes a logic operator.

20. The method of claim 1, wherein said selecting step includes selecting at least one complementary operating logic operation that includes an arithmetic operator.

21. The method of claim 1, wherein said selecting step includes selecting at least one complementary operating logic operation that includes a filtering operator.

22. The method of claim 1, wherein said selecting step includes selecting at least one complementary operating logic operation that includes a range restricting operator.

23. The method of claim 1, wherein said selecting step includes selecting at least one complementary operating logic operation that includes a multiplexing operator.

24. The method of claim 1, wherein said selecting step includes selecting at least one complementary operating logic operation that includes a pulse forming operator.

25. The method of claim 1, wherein said controller generates, at each of said sampling instants, a desired driven vector that represents a desired value of said driven vector at said future sampling instant, and generates, at each of said sampling instants, said outputted control vector that drives said value of said predicted driven vector to equal said desired driven vector at said future sampling instant.

26. The method of claim 1, wherein said controller uses an advanced control methodology to satisfy said predefined controller performance criterion.

27. A system for facilitating the design of a control and optimization scheme for generating a process control vector during each of a plurality of sampling instants, said process control vector comprising at least one process control variable and being applied to an apparatus which carries out a process having at least one process input variable and at least one process output variable, said at least one process input variable defining a process input vector and said at least one process output variable defining a process output vector, said apparatus varying said process input vector as a function of said process control vector, said system comprising:

(A) a controller design tool for facilitating the definition of at least one controller, said at least one controller for predicting a value of a driven vector during at least one future sampling instant, said driven vector being comprised of said at least one driven variable, said at least one controller generating, at each of said sampling instants, an outputted control vector that drives said value of said predicted driven vector to satisfy a predefined controller performance criterion at said at least one future sampling instant;

(B) a complementary operating logic design tool for facilitating the selecting of at least one complementary operating logic operation; and (C) an integration design tool for facilitating the combining of said at least one controller with said at least one complementary operating logic operation to control said process in accordance with at least one predefined process performance criterion;

said complementary operating logic design tool facilitating selecting said at least one complementary operating logic operation such that when said at least one complementary operating logic operation is combined with said controller, said controller operates in such a manner that said process is optimized in accordance with said at least one predefined process performance criterion.

28. The system of claim 27, wherein said controller design tool is operable for selecting one from a first group of graphical input/output operators each representing a respective type of controller operation.

29. The system of claim 28, wherein said complementary operating logic design tool is operable for selecting one from a second group of graphical input/output operators each representing a respective complementary operating logic operation.

30. The system of claim 29, wherein each of said first and second groups of graphical input/output operators includes at least one input and at least one output, and said integration design tool is operable for defining at least one interconnection between a respective one of said at least one input or said at least one output of the selected one of said first group of graphical input/output operators with a respective one of said at least one input or said at least one output of the selected one of said second group of graphical input/output operators.

31. The system of claim 30, further comprising a first compiler for generating, from the selected ones of said first and second groups of graphical input/output operators and said at least one interconnection, an intermediate code suitable for execution in at least one computing environment.

32. The system of claim 31, further comprising a second compiler for compiling said intermediate code to generate an object code suitable for execution in a respective computing environment.

33. The system of claim 27, wherein said complementary operating logic design tool facilitates selecting said at least one complementary operating logic operation such that when said at least one complementary operating logic operation is combined with said controller, said controller generates said outputted control vector that optimizes said process in accordance with said at least one predefined process performance criterion.

34. The system of claim 27, wherein said complementary operating logic design tool facilitates selecting said at least one complementary operating logic operation that is responsive to at least one process operating condition.

35. The system of claim 34, wherein said at least one predefined process performance criterion is an optimum value of said at least one process operating condition, and said complementary operating logic design tool facilitates combining said at least one controller with said at least one complementary operating logic operation such that said controller generates said outputted control vector that enables said process operating condition to approach said optimum value.

36. The system of claim 34, wherein said at least one predefined process performance criterion is a change in said at least one process operating condition, and said complementary operating logic design tool facilitates combining said at least one controller with said at least one complementary operating logic operation such that said controller generates said outputted control vector as a function of said change in said at least one process operating condition.

37. The system of claim 27, wherein said at least one predefined process performance criterion is the control of at least one process instrumentation, and said complementary operating logic design tool facilitates selecting said at least one complementary operating logic operation that controls said at least one process instrumentation.

38. The system of claim 27, wherein said complementary operating logic design tool facilitates selecting said at least one complementary operating logic operation that varies the value of a set point for said at least one controller.

39. The system of claim 27, wherein said complementary operating logic design tool facilitates selecting said at least one complementary operating logic operation that varies the value of a control period for said at least one controller.

40. The system of claim 27, wherein said complementary operating logic design tool facilitates selecting said at least one complementary operating logic operation that controls an actuator.

41. The system of claim 27, wherein said complementary operating logic design tool facilitates selecting said at least one complementary operating logic operation that operates as a function of at least one measured value.

42. The method of claim 27, wherein said complementary operating logic design tool facilitates selecting said at least one complementary operating logic operation that transforms said process output vector into said driven vector.

43. The method of claim 27, wherein said complementary operating logic design tool facilitates selecting said at least one complementary operating logic operation that transforms said outputted control vector into said process control vector.

44. The system of claim 43, wherein said apparatus carries out a simulated process and generates, using said simulated process, said process output vector in response to said process control vector that is generated by said at least one complementary operating logic operation.

45. The system of claim 27, wherein said complementary operating logic design tool includes selecting at least one complementary operating logic operation that includes a logic operator.

46. The system of claim 27, wherein said complementary operating logic design tool facilitates selecting at least one complementary operating logic operation that includes a non-linear function operator.

47. The system of claim 27, wherein said complementary operating logic design tool facilitates selecting at least one complementary operating logic operation that includes an arithmetic operator.

48. The system of claim 27, wherein said complementary operating logic design tool facilitates selecting at least one complementary operating logic operation that includes a filtering operator.

49. The system of claim 27, wherein said complementary operating logic design tool facilitates selecting at least one complementary operating logic operation that includes a range restricting operator.

50. The system of claim 27, wherein said complementary operating logic design tool facilitates selecting at least one complementary operating logic operation that includes a multiplexing operator.

51. The system of claim 27, wherein said complementary operating logic design tool facilitates selecting at least one complementary operating logic operation that includes a pulse forming operator.

52. The system of claim 27, wherein said controller generates, at each of said sampling instants, a desired driven vector that represents a desired value of said driven vector at said future sampling instant, and generates, at each of said sampling instants, said outputted control vector that drives said value of said predicted driven vector to equal said desired driven vector at said future sampling instant.

53. The system of claim 27, wherein said controller uses an advanced control methodology to satisfy said predefined controller performance criterion.

54. A method of generating a process control vector during each of a plurality of sampling instants, said process control vector comprising at least one process control variable and being applied to an apparatus which carries out a process having at least one process input variable and at least one process output variable, said at least one process input variable defining a process input vector and said at least one process output variable defining a process output vector, said apparatus varying said process input vector as a function of said process control vector, said method comprising the steps of:

(A) predicting a value of a driven vector during at least one future sampling instant, said driven vector being comprised of said at least one driven variable;

(B) generating, at each of said sampling instants, an outputted control vector that drives said value of said predicted driven vector to satisfy a predefined controller performance criterion at said at least one future sampling instant; and (C) performing at least one complementary operating logic operation to control said predicting and generating steps such that said process is optimized in accordance with at least one predefined process performance criterion.

55. The method of claim 54, wherein said performing step includes performing said at least one complementary operating logic operation such that said outputted control vector is generated that optimizes said process in accordance with said at least one predefined process performance criterion.

56. The method of claim 54, wherein said performing step includes performing said at least one complementary operating logic operation that is responsive to at least one process operating condition.

57. The method of claim 56, wherein said at least one predefined process performance criterion is an optimum value of said at least one process operating condition, and said performing step performs said at least one complementary operating logic operation such that said outputted control vector that enables said process operating condition to approach said optimum value is generated.

58. The method of claim 56, wherein said at least one predefined process performance criterion is a change in said at least one process operating condition, and said performing step performs said at least one complementary operating logic operation such that said outputted control vector is generated as a function of said change in said at least one process operating condition.

59. The method of claim 54, wherein said at least one predefined process performance criterion is the control of at least one process instrumentation, and said performing step performs said at least one complementary operating logic operation that controls said at least one process instrumentation.

60. The method of claim 54, wherein said performing step includes at least one complementary operating logic operation that varies the value of a set point.

61. The method of claim 54, wherein said performing step includes at least one complementary operating logic operation that varies the value of a control period.

62. The method of claim 54, wherein said performing step includes at least one complementary operating logic operation that controls an actuator.

63. The method of claim 54, wherein said performing step includes at least one complementary operating logic operation that is performed as a function of at least one measured value.

64. The method of claim 54, wherein said performing step includes performing said at least one complementary operating logic operation that transforms said process output vector into said driven vector.

65. The method of claim 54, wherein said performing step includes performing said at least one complementary operating logic operation that transforms said outputted control vector into said process control vector.

66. The method of claim 65, wherein said apparatus carries out a simulated process and generates, using said simulated process, said process output vector in response to said process control vector that is generated by said at least one complementary operating logic operation.

67. The method of claim 54, wherein said at least one complementary operating logic operation includes a logic operator.

68. The method of claim 54, wherein said at least one complementary operating logic operation includes an arithmetic operator.

69. The method of claim 54, wherein said at least one complementary operating logic operation includes a filtering operator.

70. The method of claim 54, wherein said at least one complementary operating logic operation includes a range restricting operator.

71. The method of claim 54, wherein said at least one complementary operating logic operation includes a multiplexing operator.

72. The method of claim 54, wherein said at least one complementary operating logic operation includes a pulse forming operator.

73. The method of claim 54, wherein said generating step generates, at each of said sampling instants, a desired driven vector that represents a desired value of said driven vector at said future sampling instant, and generates, at each of said sampling instants, said outputted control vector that drives said value of said predicted driven vector to equal said desired driven vector at said future sampling instant.

74. The method of claim 54, wherein said generating step uses an advanced control methodology to satisfy said predefined controller performance criterion.

75. A system for generating a process control vector during each of a plurality of sampling instants, said process control vector comprising at least one process control variable and being applied to an apparatus which carries out a process having at least one process input variable and at least one process output variable, said at least one process input variable defining a process input vector and said at least one process output variable defining a process output vector, said apparatus varying said process input vector as a function of said process control vector, said system comprising:

(A) at least one controller for predicting a value of a driven vector during at least one future sampling instant, said driven vector being comprised of at least one driven variable, said at least one controller for generating, at each of said sampling instants, an outputted control vector that drives said value of said predicted driven vector to satisfy a predefined controller performance criterion at said at least one future sampling instant;

(B) complementary operating logic for performing at least one complementary operating logic operation; and (C) at least one interconnection between said at least one controller and said complementary operating logic such that said controller operates in a manner that said process is controlled in accordance with at least one predefined process performance criterion.

76. The system of claim 75, wherein said at least one complementary operating logic is operable such that said controller generates said outputted control vector that optimizes said process in accordance with said at least one predefined process performance criterion.

77. The system of claim 75, wherein said at least one complementary operating logic is responsive to at least one process operating condition.

78. The system of claim 77, wherein said at least one predefined process performance criterion is an optimum value of said at least one process operating condition, and said at least one complementary operating logic is operable such that said controller generates said outputted control vector that enables said process operating condition to approach said optimum value.

79. The system of claim 77, wherein said at least one predefined process performance criterion is a change in said at least one process operating condition, and said at least one complementary operating logic is operable such that said controller generates said outputted control vector as a function of said change in said at least one process operating condition.

80. The system of claim 75, wherein said at least one predefined process performance criterion is the control of at least one process instrumentation, and said at least one complementary operating logic is operable such that said at least one complementary operating logic controls said at least one process instrumentation.

81. The system of claim 75, wherein said complementary operating logic varies the value of a set point for said at least one controller.

82. The system of claim 75, wherein said complementary operating logic varies the value of a control period for said at least one controller.

83. The system of claim 75, wherein said complementary operating logic controls an actuator.

84. The system of claim 75, wherein said complementary operating logic is a function of at least one measured value.

85. The system of claim 75, wherein said complementary operating logic transforms said process output vector into said driven vector.

86. The system of claim 75, wherein said complementary operating logic transforms said outputted control vector into said process control vector.

87. The system of claim 86, wherein said apparatus carries out a simulated process and generates, using said simulated process, said process output vector in response to said process control vector that is generated by said complementary operating logic.

88. The system of claim 75, wherein said at least one complementary operating logic operation includes a logic operator.

89. The system of claim 75, wherein said at least one complementary operating logic operation includes an arithmetic operator.

90. The system of claim 75, wherein said at least one complementary operating logic operation includes a filtering operator.

91. The system of claim 75, wherein said at least one complementary operating logic operation includes a range restricting operator.

92. The system of claim 75, wherein said at least one complementary operating logic operation includes a multiplexing operator.

93. The system of claim 75, wherein said at least one complementary operating logic operation includes a pulse forming operator.

94. The system of claim 75, wherein said controller generates, at each of said sampling instants, a desired driven vector that represents a desired value of said driven vector at said future sampling instant, and generates, at each of said sampling instants, said outputted control vector that drives said value of said predicted driven vector to equal said desired driven vector at said future sampling instant.

95. The system of claim 75, wherein said controller uses an advanced control methodology to satisfy said predefined controller performance criterion.

* * * * *